(12) United States Patent
Kicinski et al.

(10) Patent No.: US 6,405,139 B1
(45) Date of Patent: Jun. 11, 2002

(54) SYSTEM FOR MONITORING PLANT ASSETS INCLUDING MACHINERY

(75) Inventors: Walter Kicinski; Christine White, both of Houston, TX (US)

(73) Assignee: Bently Nevada Corporation, Minden, NV (US)

( * ) Notice: Subject to any disclaimer, the term of this patent is extended or adjusted under 35 U.S.C. 154(b) by 0 days.

(21) Appl. No.: 09/154,411

(22) Filed: Sep. 15, 1998

(51) Int. Cl.[7] .............................. H05K 7/00; H01R 4/60; G06F 19/00
(52) U.S. Cl. .......................... 702/33; 439/208; 361/679
(58) Field of Search .......................... 702/33, 182, 183, 702/184, 185, 188; 439/207, 208, 210, 211; 361/679, 728, 748, 826, 535, 539

(56) References Cited

U.S. PATENT DOCUMENTS

| | | | | |
|---|---|---|---|---|
| 5,430,663 A | * | 7/1995 | Judd et al. | 364/550 |
| 5,432,711 A | * | 7/1995 | Jackson et al. | 364/514 |
| 5,647,767 A | * | 7/1997 | Scheer et al. | 439/620 |
| 5,726,911 A | * | 3/1998 | Canada et al. | 364/550 |
| 5,739,463 A | * | 4/1998 | Diaz et al. | 174/35 R |
| 5,740,080 A | * | 4/1998 | Shook et al. | 364/557 |
| 5,844,501 A | * | 12/1998 | El-lbiary | 340/870.17 |
| 5,852,351 A | * | 12/1998 | Canada et al. | 318/490 |
| 5,870,695 A | * | 2/1999 | Brown et al. | 702/138 |
| 5,899,962 A | * | 5/1999 | Louwagie et al. | 702/138 |
| 5,967,838 A | * | 10/1999 | Wozniczka et al. | 439/552 |
| 6,035,265 A | * | 3/2000 | Dister et al. | 702/183 |
| 6,041,287 A | * | 3/2000 | Dister et al. | 702/182 |
| 6,138,078 A | * | 10/2000 | Canada et al. | 702/44 |
| 6,179,655 B1 | * | 1/2001 | Wozniczka et al. | 439/552 |
| 6,243,654 B1 | * | 6/2001 | Johnson et al. | 702/85 |

OTHER PUBLICATIONS

IEEE Std 1451.2–1997 IEEE Standard for a Smart Transducer Interface for Sensors and Actuators—Transducer to Microprocessor Communication Protocols and Transducer Electronic Data Sheet (TEDS) Formats.*

Orbit magazine, Marco Alcalde, "New Trendmaster© 2000 flexiTIM: Simplified Design Significantly Reduces Costs", Jun., 1997, p. 33.

* cited by examiner

Primary Examiner—Patrick Assouad
(74) Attorney, Agent, or Firm—Dennis DeBoo

(57) ABSTRACT

A system for monitoring machine data which avoids the need for the cumbersome placement of junction boxes adjacent machines that heretofore had required installing the junction boxes on walls, studs, or stanchions. Instead, a rigid conduit having conductors therein communicate with an integrated sealed instrument package that allows the conductors' communication between an asset such as a machine to be monitored via transducers to a signal processor at a remote location. A multiplicity of assets can be monitored through this arrangement by providing signal differentiation for the various machines.

16 Claims, 19 Drawing Sheets

| Fig. 16A |
| Fig. 16B |

SYSTEM FOR MONITORING PLANT ASSETS INCLUDING MACHINERY

FIELD OF THE INVENTION

The following invention relates generally to routing communication systems which link instrumentalities together. More specifically, the instant invention is directed to a conduit network having conductors running therethrough and an instrument package which accesses the conductors and routes information to the conductors from measuring transducers strategically deployed on assets including machinery to be monitored.

BACKGROUND OF THE INVENTION

Industrial plants, such as chemical processing facilities and power generation plants utilize pumps, compressors, generators, turbines and the like which need to be maintained. The best form of maintenance is preventative maintenance, and to achieve that goal, accurate diagnostic procedures should be in place which signal the onset of machine anomalies while they can still be repaired economically. One efficient method to provide accurate diagnostic procedures is to have at least one central processing system operatively coupled to a permanently installed data collection system interacting with assets including machinery and throughout the plant or facility. Thus, the ability to conveniently identify and diagnose possible asset problems from any location at any time is realized. That means finding potential malfunctions as soon as possible for efficient planning of maintenance.

However, retrofitting existing assets with a permanently installed data collection system to provide a link between the machinery being monitored and the processing system has traditionally been quite costly and time consuming as a result of the cost due to enclosures, conduit fittings, conduit runs near the monitored machines and the cost due to the labor required for this installation.

For example, FIG. 1 reflects a prior art junction box which must be wall mounted, located on a stud, or other type of support. Other techniques first require securing by means of first installing an upstanding stanchion adjacent the machine so that hardwiring can communicate from the transducer to the signal processor through the junction box and associated conduit. The routing and wiring of the communications link through these junction boxes has been historically a labor intensive and costly endeavor.

A need therefore exists for an improved means for allowing communication between a diagnostic transducer and the signal processor located at a remote location from the transducer.

The following prior art reflects the state of the art of which applicant is aware and is included herewith to discharge applicant's acknowledged duty to disclose relevant, prior art. It is stipulated, however, that none of these references teach singly nor render obvious when considered in any conceivable combination the nexus of the instant invention as disclosed in greater detail hereinafter and as particularly claimed.

Other Prior Art (Including Author, Title, Date, Pertinent Pages, Etc.) *Orbit* magazine, Marco Alcalde, "New Trendmaster® 2000 flexiTIM: Simplified Design Significantly Reduces Costs", June, 1997, Page 33.

SUMMARY OF THE INVENTION

The instant invention is directed to a means and method for quickly and economically providing a communication link between an asset such as machinery being monitored and a processor means which receives signals from a transducer strategically located at the machine or other asset so that signals can be transmitted to the processor means to determine machine status.

A rigid conduit protects communication links, for example, conductors disposed therewithin. In one embodiment, the conduit includes an opening allowing access to the conductors. The opening is contoured to receive a sealing gasket about its outer periphery. The gasket in turn receives an electronic instrument package which attaches to the opening on the conduit in sealing engagement by sandwiching the gasket between the instrument package and the periphery circumscribing the opening on the conduit. The instrument package includes circuitry which communicates with cabling that leads to sensors such as transducers used to monitor machinery or other assets. The interior of the instrument package includes a well within which potting compound can be deployed. Thus, the instrument package circuitry is tightly sealed prohibiting the throughpassage of contamination within the instrument package. Sealing the exterior environment from the interior of the instrument package and conduit provides a durable, rugged and reliable communication system. The electronic instrument package is substantially easier to install than the prior art systems and appreciably more economical initially and subsequently for maintenance.

OBJECTS OF THE INVENTION

Accordingly, it is an object of the instant invention to provide a new and novel system for monitoring machine data.

A further object of the instant invention is to provide an integrated instrument package and conduit system.

A further object of the instant invention is to provide that which has been characterized above that is durable in construction, comparatively easy to install and appreciably less expensive than prior art systems.

A further object of the instant invention is to provide that which has been characterized above which obviates the need for junction boxes and the attendant requirements that junction boxes be mounted on walls, studs, stanchions or the like.

Viewed from a first vantage point a system for monitoring machine data, comprising, in combination: a plurality of machines to be monitored, sensor means operatively coupled to each of said plural machines, each said sensor means delivering an output signal correlative of the machine data, and conduit means extending proximate to said sensor means and leading to a signal processor, said conduit means including a sealed instrument package allowing communication between said sensors and said signal processor via signal conductors passing from said sensor means, through said instrument package and to said signal processor.

Viewed from a second vantage point an integrated instrument package and conduit, comprising, in combination: conductors running through said conduit, an opening in said conduit exposing terminals of said conductors, and sealing means between said conduit opening and said instrument package, said instrument package including connectors removably attachable to said terminals and leading through said instrument package to a sensing transducer.

These and other objects will be made manifest when considering the following detailed specification when taken in conjunction with the appended drawing figures.

DESCRIPTION OF PREFERRED EMBODIMENTS

Figure 1:
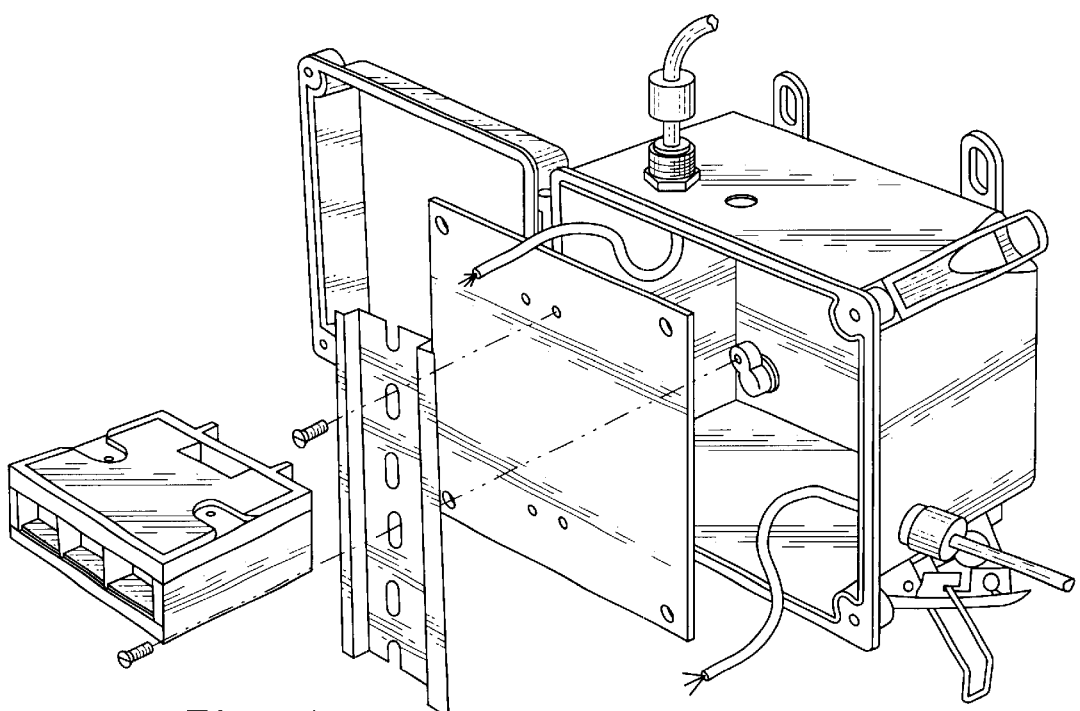
FIG. 1 is a perspective view of the prior art junction box.

Considering the drawings, wherein like reference numerals refer to like parts throughout the various drawing figures, reference numeral 10 is directed to the system for monitoring machine data according to the instant invention.

Figure 2:
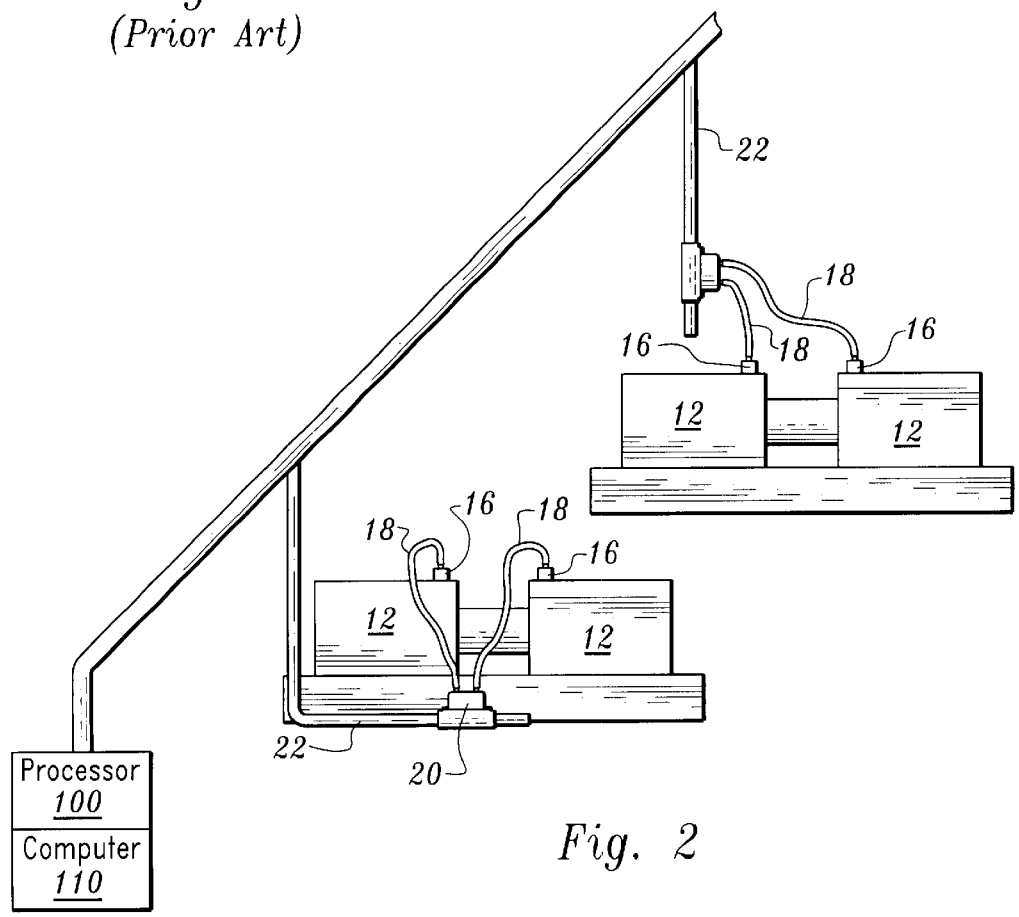
FIG. 2 is a schematic of the system according to the instant invention.
Figure 3:
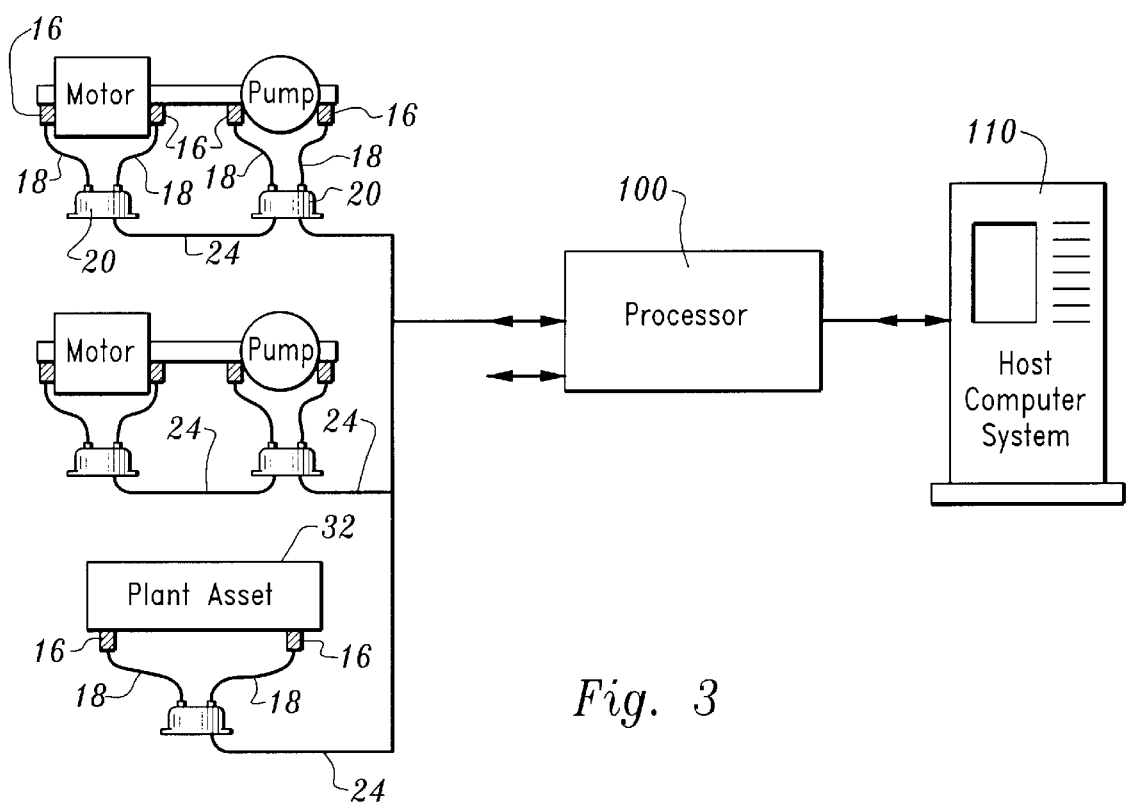
FIG. 3 is a block diagram according to the instant invention providing greater detail from FIG. 2.

In its essence, and referring to FIGS. 2 and 3, status of the machinery 12 is being monitored by a signal processor 100 via signals engendered from a plurality of transducers 16 strategically placed in areas of the machinery which have been correlated with zones of know proclivities toward ware. The transducers 16 communicate to the signal processor 100 via transducer cables 18 which lead to the signal processor 100 via a conduit 22 having conductors 24 disposed therein. The conductors 24 communicate with the transducer cables 18 through electronic means 160 disposed in an interior of an instrument packaged 20 shown in greater detail in FIGS. 10 through 17. Note that the instrument package can be coupled to the conduit in a vertical angel, a horizontal angle or at any angle therebetween.

More specifically, and referring to FIG. 3, status of machinery 12 and plant asset 32 is being monitored by a signal processor or data acquisition system 100 via signals generated from transducers 16 strategically located in areas to be monitored. The transducers 16 communicate to the signal processor or data acquisition system 100 via transducer cables 18 being operatively coupled to the instrument packages 20 which in turn are coupled to the data acquisition system via conductors 24 which stream through the conduit 22. The protocol employed for the system communication cables 24 located in the conduit 22 can be a fieldbus protocol, a modbus protocol, a canbus protocol or proprietary. The data acquisition system can be coupled to a host computer system 110 via a computer link such as a ISA bus, PCI bus, ethernet, IEEE-1392, USB or an RS-232 link.

Figure 4:
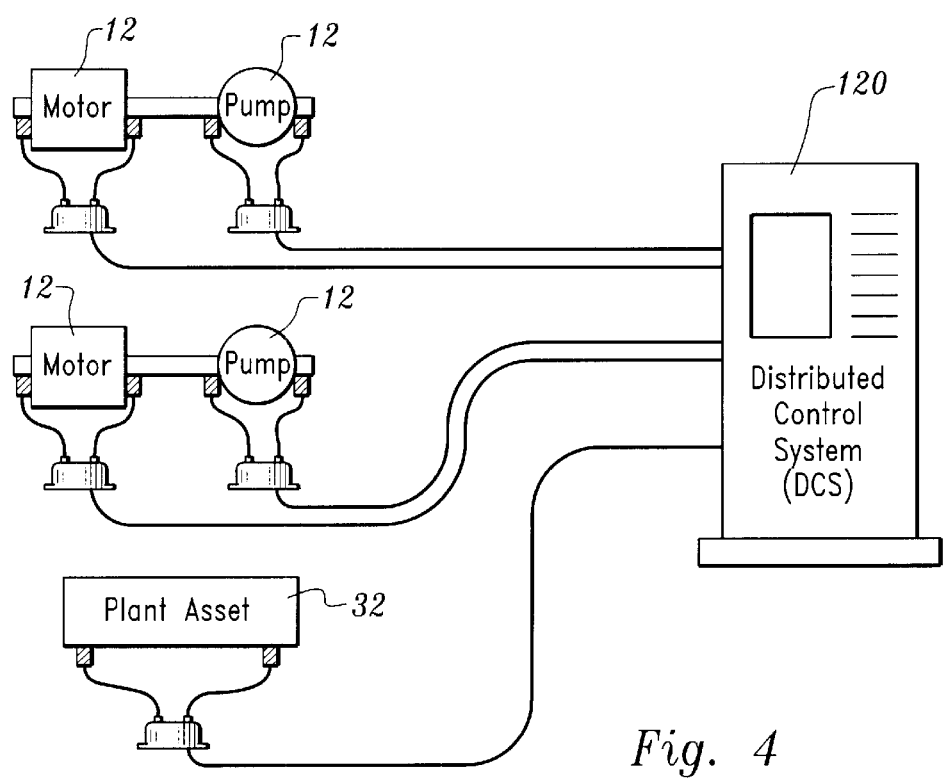
FIG. 4 is a further block diagram showing a distributed control system according to the instant invention.

Alternatively, and referring to FIG. 4, the transducers 16 can communicate to a distributed control system (DCS) 112 via the transducer cables 18 which lead to the distributed control system 112 via instrument packages 20 and conductors 24 housed in conduit 22. The conductors 24 communicate with the transducer cables 18 through the electronic means 120 housed within the instrument packages 20. Thus, the status of the machinery 12 and plant assets 32 maybe monitored by the distributed control system 112. The distributed control system provides a computerized/integrated manufacturing/process system.

Figure 5:
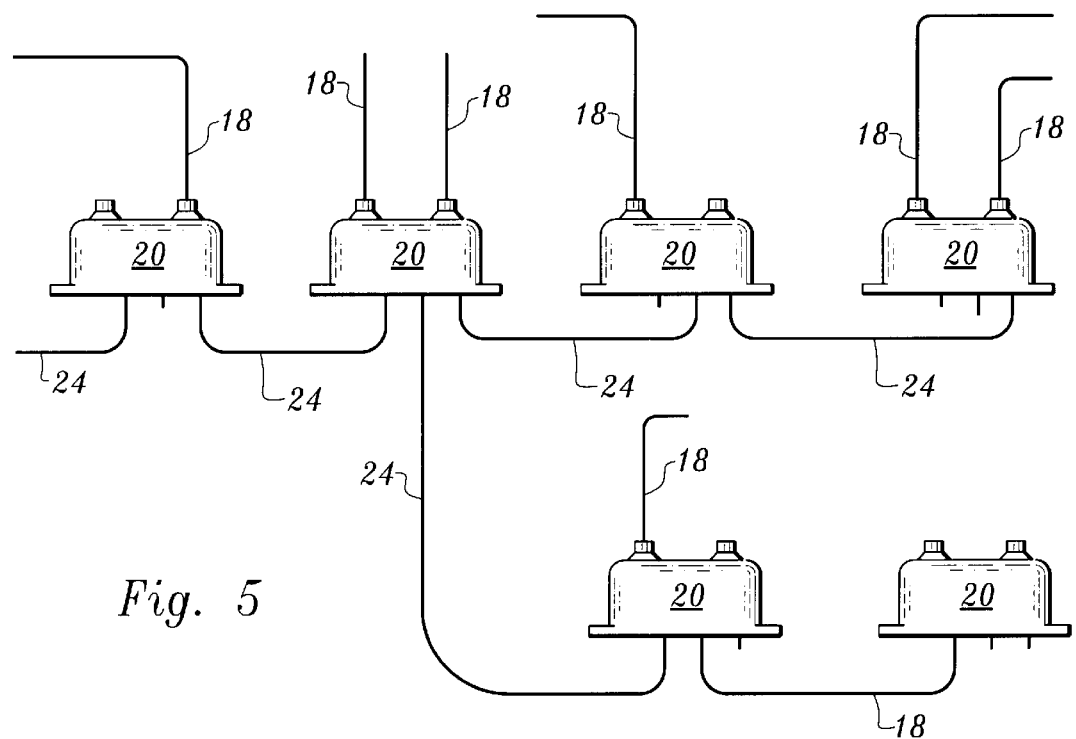
FIG. 5 is a branching diagram showing how a multiplicity of the integrated instrument packages and the conduits can be linked both serially and in parallel.

FIG. 5 outlines one possible branching diagram allowing a multiplicity of transducers and a multiplicity of machines and assets to be monitored simultaneously by a single signal processor 100. As show in FIG. 5, one row of instrument packages are aligned in series while a second row can be linked in parallel. This is possible because there is a third connector cluster according to the instant invention and as shown in FIG. 6.

Figure 6:
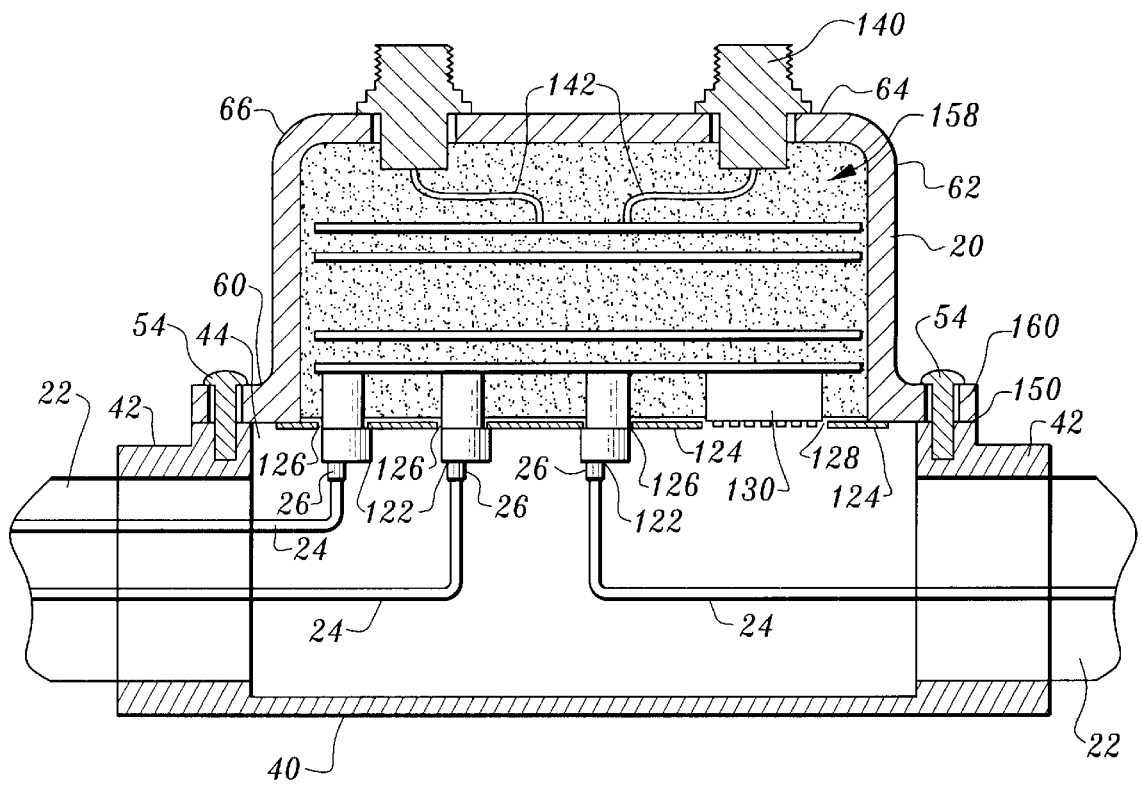
FIG. 6 is a sectional view showing the conduit and instrument package deployed.

Referring to FIG. 6, each instrument package 20 communicates with the conductors 24 contained within the ridged conduit 22 via a conduit body 40 formed in the conduit 22. The conduit body 40 includes first and seconds ferules 42 at opposite sides of the body 40 and transition in overlying engagement with the rigid conduit 22 at both ends thereof. The body 40 itself is substantially tub shaped having an opening 44 allowing access to connectors 26 terminating at extremities of the conductors 24. The opening 44 of the conduit body has a peripheral ledge 46 which receives a substantially rectangular gasket 150 thereover (please see FIG. 7). The gasket 150 includes enlarged end portions 50 having holes 52 therein to receive screws 54 which pass through a flange 60 integrally formed on a casing or housing 62 which defines a portion of the instrument package 20. Transducer cables 18 extend from a top wall 64 of the housing 62 via fittings 140. A rounded peripheral edge or boundary 66 provides the transitional area between the top wall 64 lying in a first plane and the housing 62 having four connected walls lying in a second plane substantially perpendicular to the first plane. FIG. 6 shows three clusters of connectors 26 associated with conductors 24. Preferably, each cluster includes five connectors 26 associated with five conductors 24.

More particularly, the reference numerals will not be belabored herein. The connectors 26 shown in FIGS. 5 and 6 are one, two and three in number. Each connector 26 includes a cluster of five wires and each has a coupling 28 complemental to the receiving areas of terminal blocks 122 shown in FIGS. 7 through 9. The terminal block 122 in turn communicates with a circuit board to be described and allows both serial and parallel connection between adjacent integrated instrument packages 20. The terminal blocks 122 pass through a stainless steal label and support plate 124 having a plurality of portals including three portals 126 providing clearance for the terminal blocks 122. Another portal 128 provides clearance for a switch 130 having a protective membrane thereover to pass therethrough.

Figure 8:
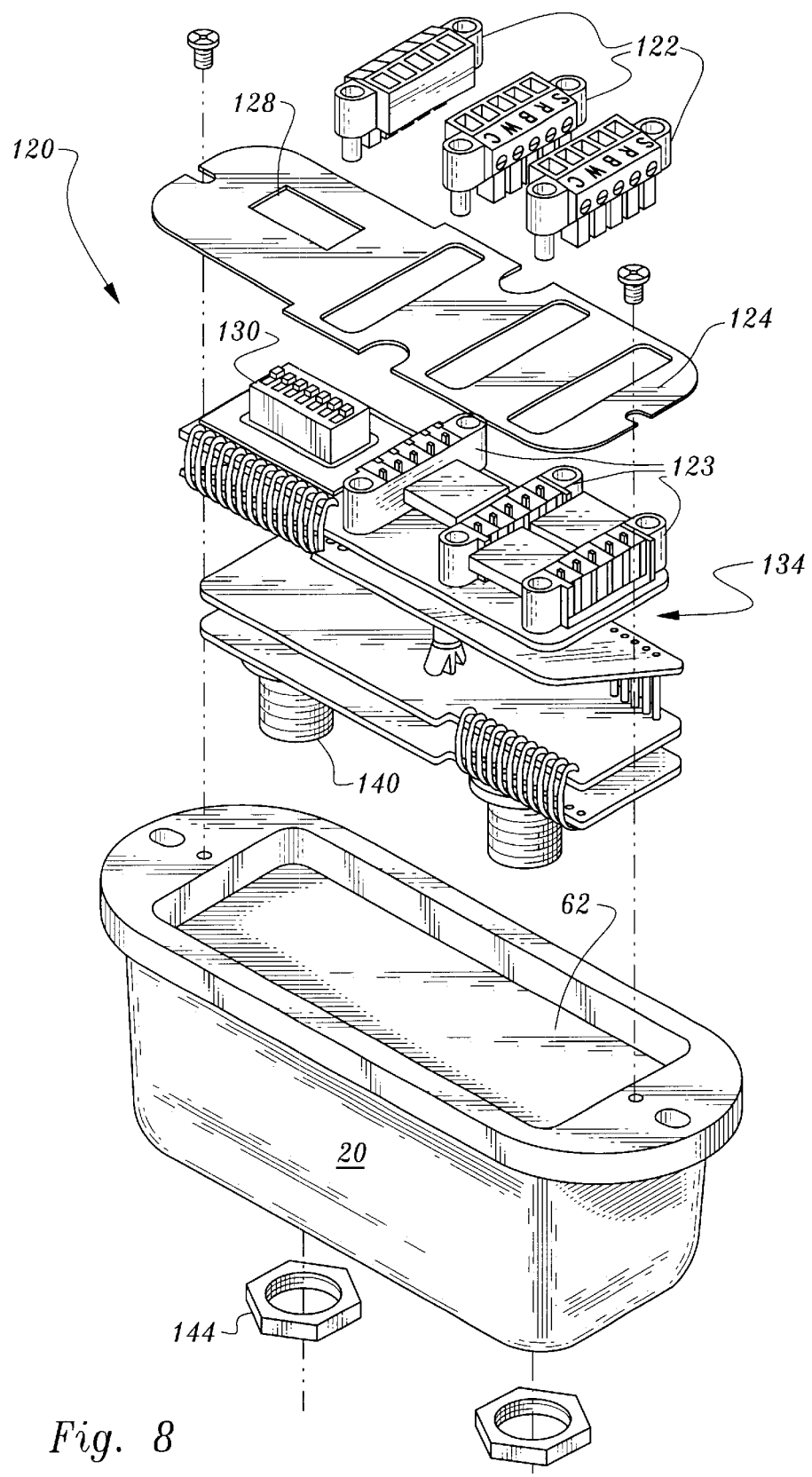
FIG. 8 is an exploded parts perspective view of the integrated instrument package according to the instant invention.

Referring to FIG. 8, the terminal blocks are placed in mating engagement with headers 123 mounted on a circuit board 134. The circuit board 134 is preferably divided up into a plurality of boards which are hinged to fold in an accordion manner. One or more threaded connectors 140 pass through the top wall 64 of the housing 62 and are connected to a lower most section of the circuit board 134. The threaded connectors 140 are fixed in place by means of nuts 144 which engage an exterior top surface of the top wall 64.

Figure 10:
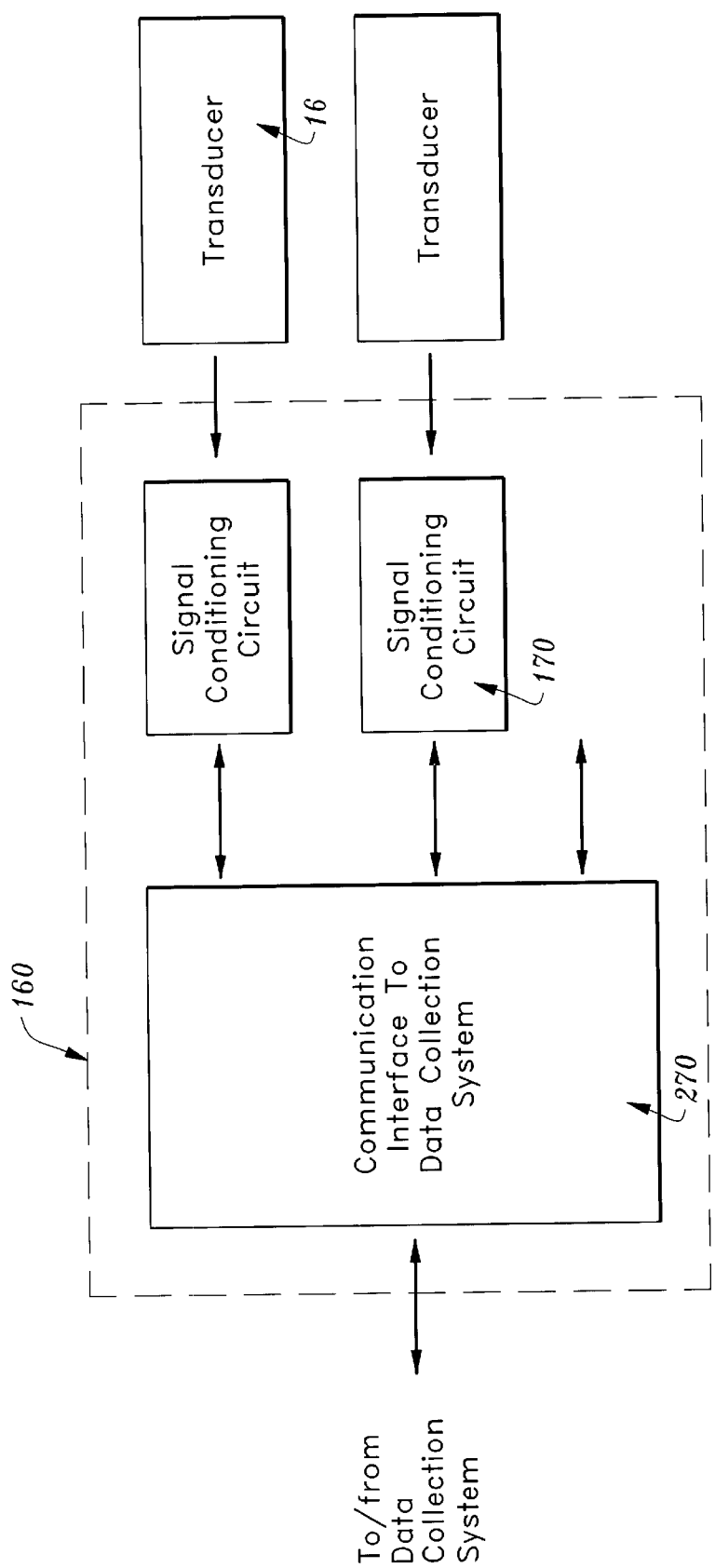
FIG. 10 is a general block diagram in respect of the operating elements shown in FIG. 8.

Alternatively, and referring to FIG. 10, the threaded cable connectors 140 which lead to the transducers could be placed on the exterior of the housing 62 with the retaining nuts 144 placed on the inside if desired. Cable conductors 142 would then pass through the top wall 64 of the housing 62 to interconnect the lower most section of the circuit board 134 to the threaded cable connector. Note that gasket 150 is substantially oval in shape and includes three transfers gasket membranes 152 connecting long sides of the oval gasket and extending between adjacent strip terminal blocks 122. An opening is provided to allow access to the switch 130.

Figure 7:
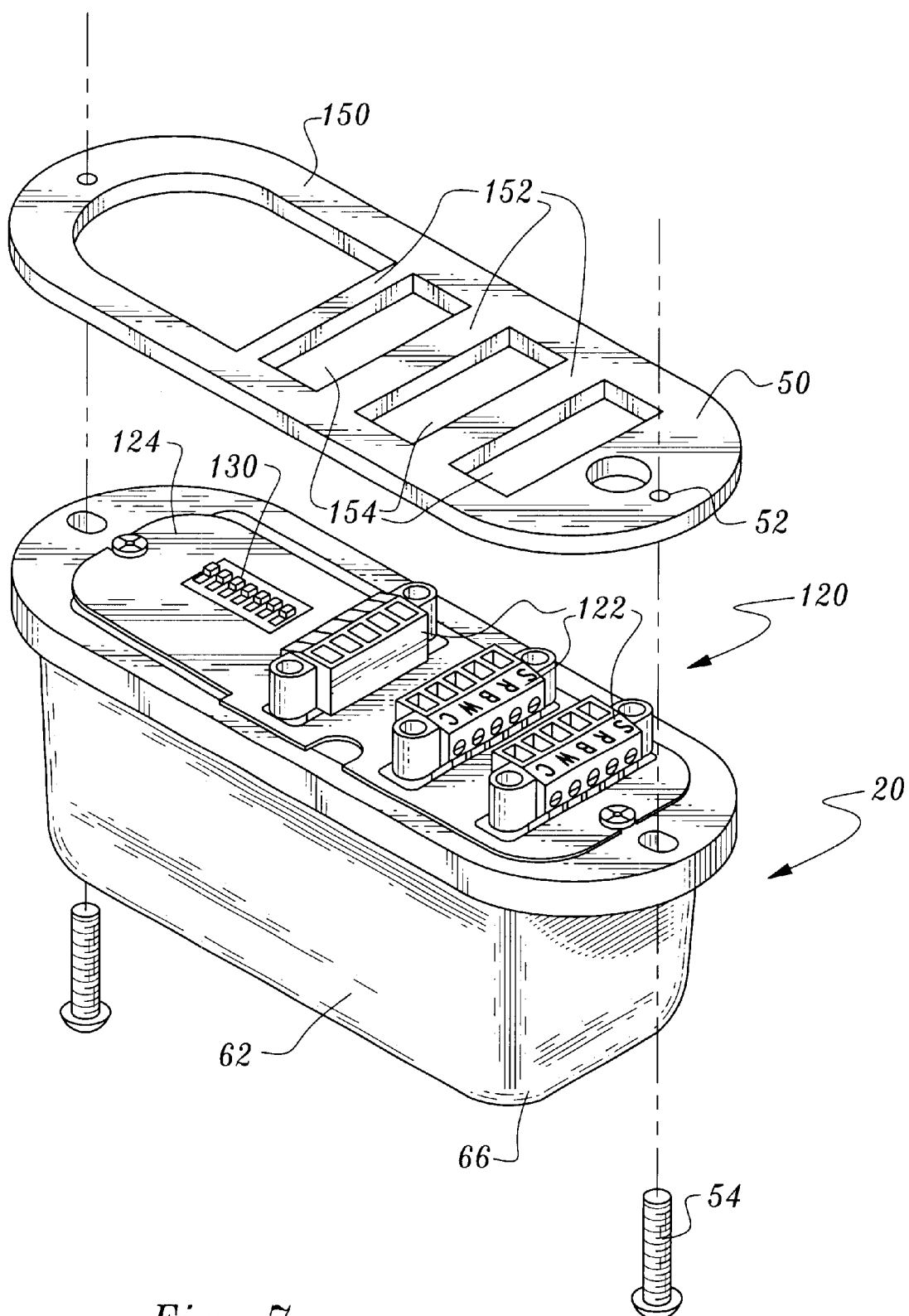
FIG. 7 is a perspective view of the integrated package inverted showing a bottom face thereof.

Referring to FIG. 7, a potting material 158 envelopes all of the hardware within the interior of the housing 62. Thus, the potting material provides support, insulation and protection for the interior hardware. Furthermore, the potting material provides ruggedness to the instrument package and precludes fluid ingression to the electronics contained within the housing 62. Preferably, the potting is an epoxy which is poured in as a liquid and heat cured to reach a state of solidification. Alternatively, the internal hardware may be sealed with O rings or the internal hardware maybe affixed together and then to plate 124.

Referring to FIG. 10, a general block diagram of the instrument package electronic means 160 is shown operatively coupled between the transducers 16 and a data collection system 100,110 or 120. The instrument package electronic means 160 includes signal conditioning circuitry means 170 interfacing between transducers 16 and a communication interface 270. The communication interface 270 couples the signal conditioning circuitry means 170 to the data collection system.

Figure 11:
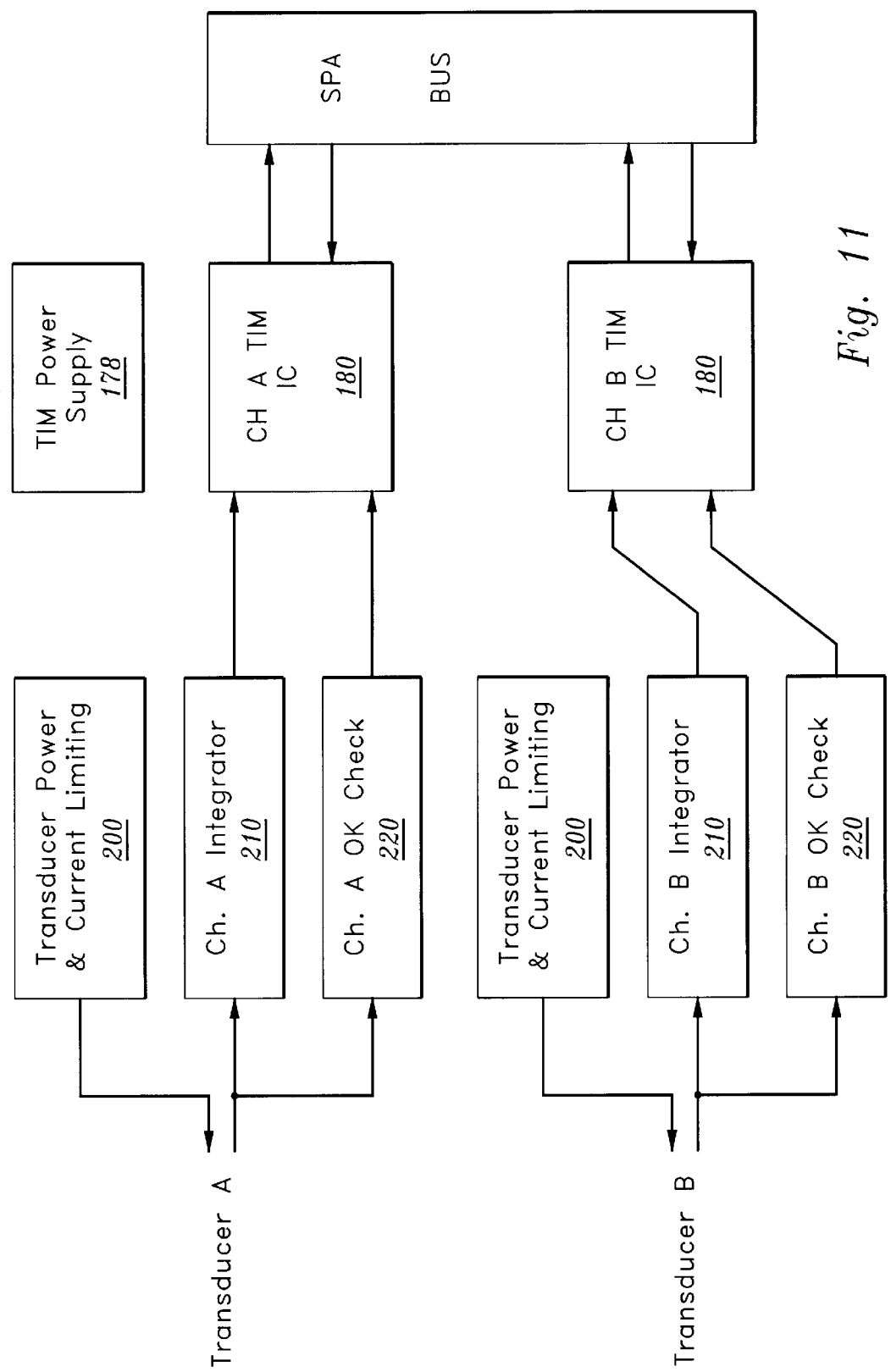
FIG. 11 is a block diagram which provides greater detail than that which is shown in FIG. 10.

In one embodiment, and referring to FIG. 11, each signal conditioning circuit means 170 includes a transducer interface module 180, a transducer power and current limiting module, an integrator module 210 and a channel check module 220. The transducer interface module 180 operatively couples the integrator and check modules to a bus structure 272 of the communication interface 270.

Figure 12:
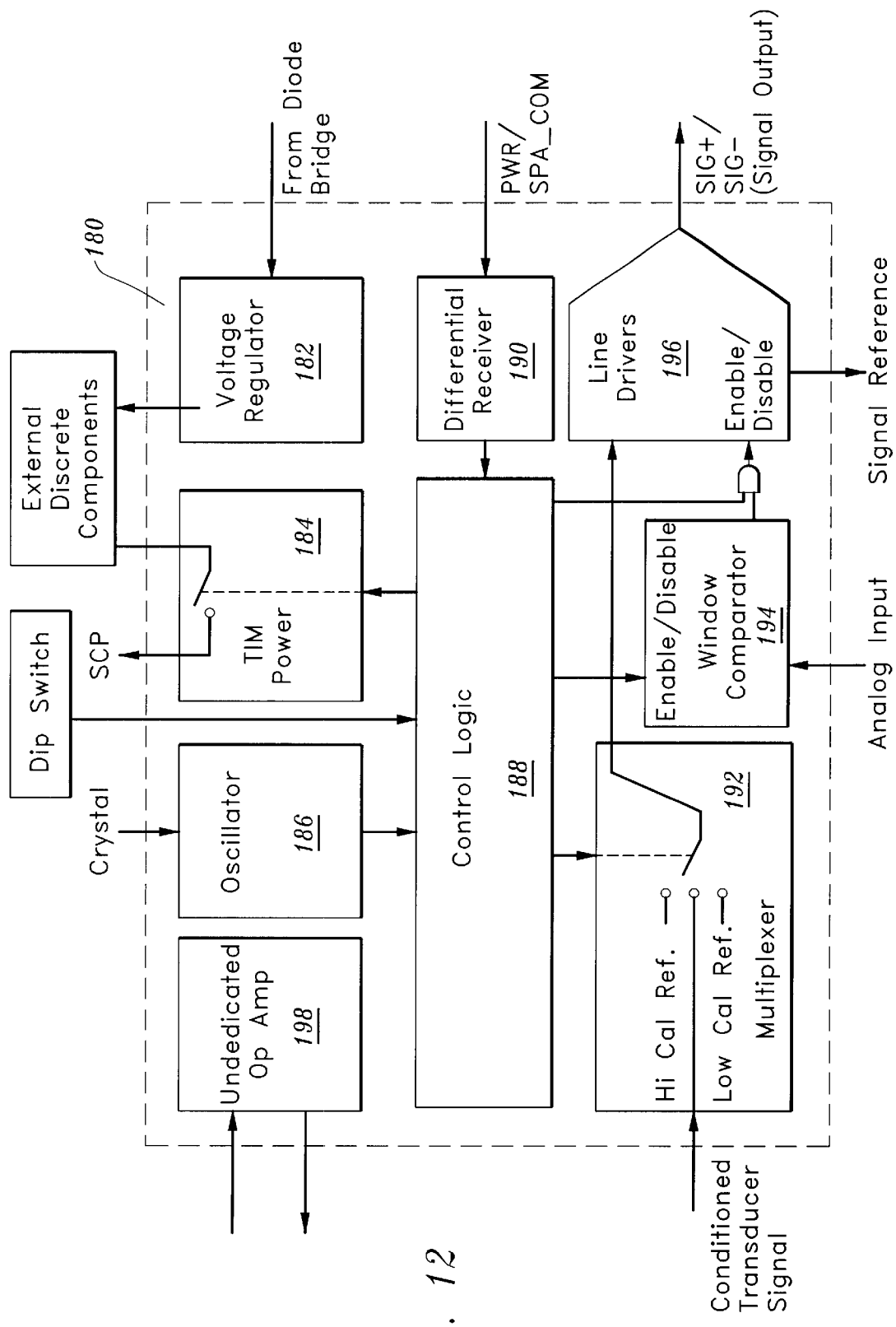
FIGS. 12 through 15 are block diagrams which provide greater detail than that which is shown in FIG. 11.
Figures 16, 16A:
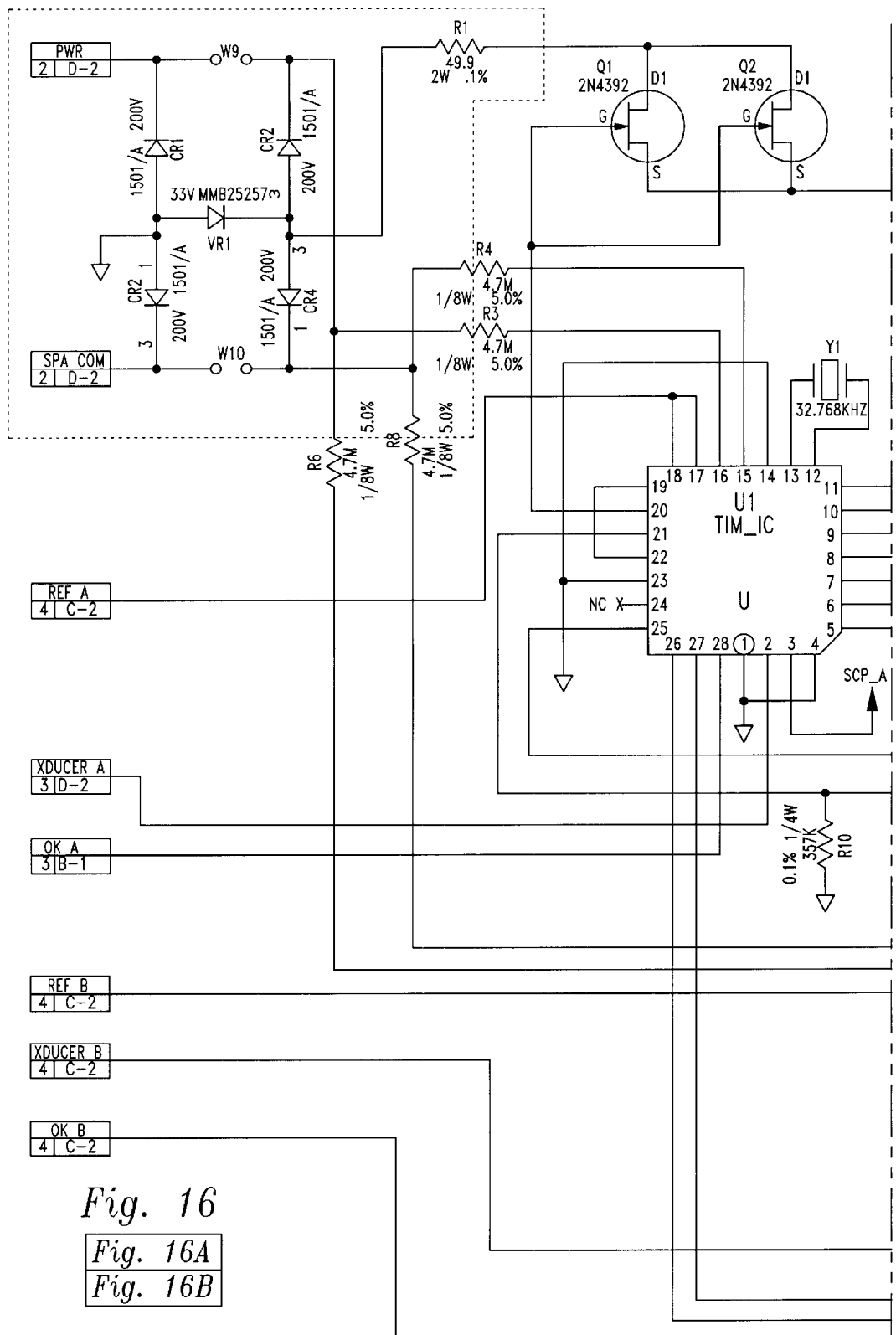
FIGS. 16 and 17 are schematics of one circuit which can be used to implement that which is shown in FIGS. 10 through 15.
Figure 16B:
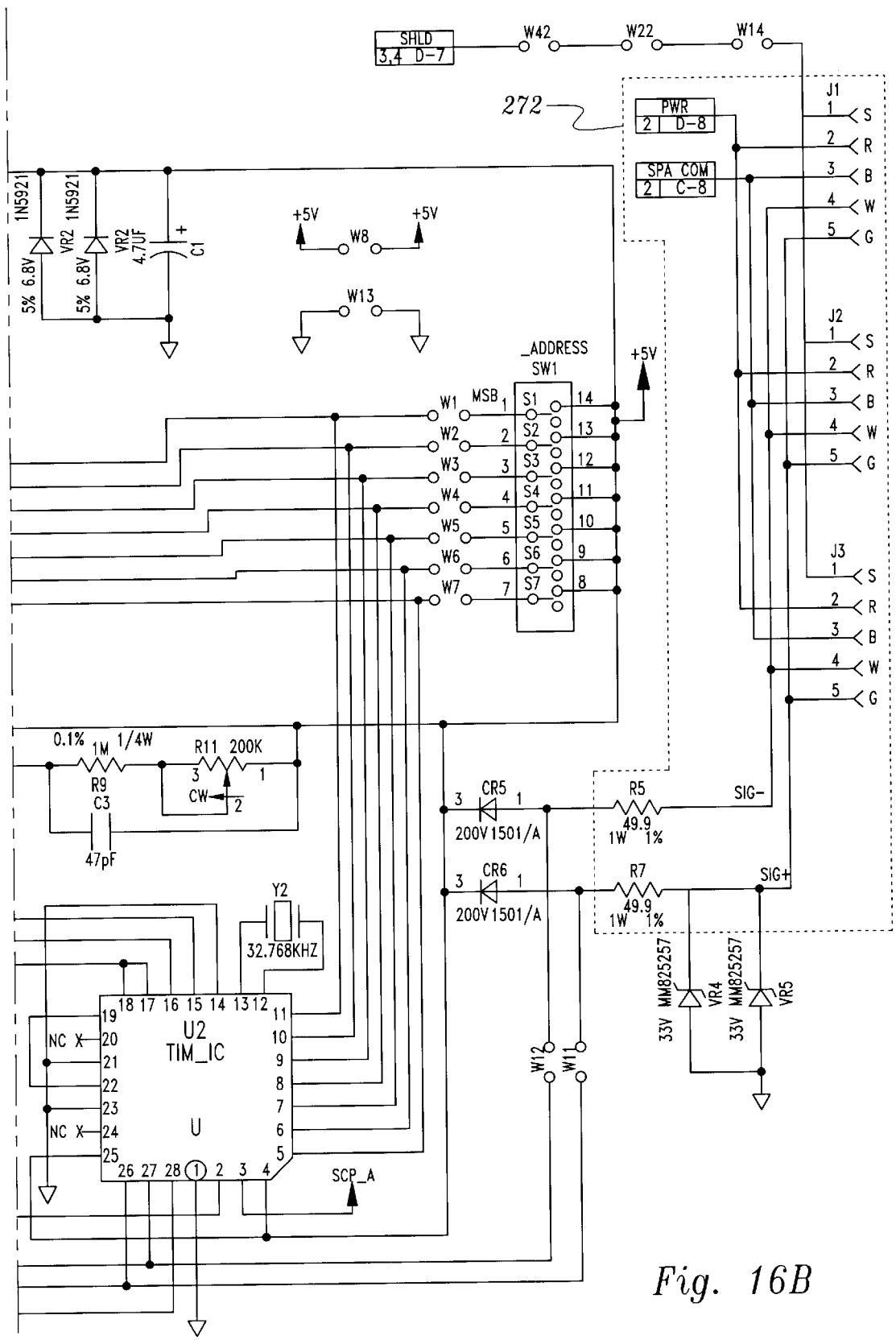

Referring to FIGS. 12 and 16, the transducer interface module 180 includes a voltage regulator 182, a transducer interface module power means 184, an oscillator 186, control logic 188, a differential receiver 190, a multiplexer 192, a window comparator 194, line drivers 196 and a undedicated op-amp 198. The transducer interface module power means provides the necessary power for the components on the module by receiving a regulated voltage from the voltage regulator being driven by a diode bridge connected to power lines of the conductors 24. The control logic 188 is powered by the transducer interface module power means 184 and receives a timing or clock signal from the oscillator module 186 operatively coupled to an external crystal. The DIP switch 130 is connected to the control logic for providing a unique address for the transducer interface module 180. The differential receiver 190 is coupled to the control logic and serves to interface the signal from the processor 100, 120 to the control logic. The multiplexer 192 is connected to the control logic 188, the transducer signal conditioner 170 and the line drivers 196. The multiplexer, under the orchestration of the control logic sends a high calibration signal, a low calibration signal or a conditioned transducer signal to the line drivers 196 which drive the appropriate conductors 24 to transmit these respective signals to the processor 100,120. A widow comparator 194 is coupled between the control logic 188 and the line drivers 196 to enable or disable the line drivers under predetermined conditions. The control logic orchestrates the operations of the transducer interface module 180.

Figure 13:
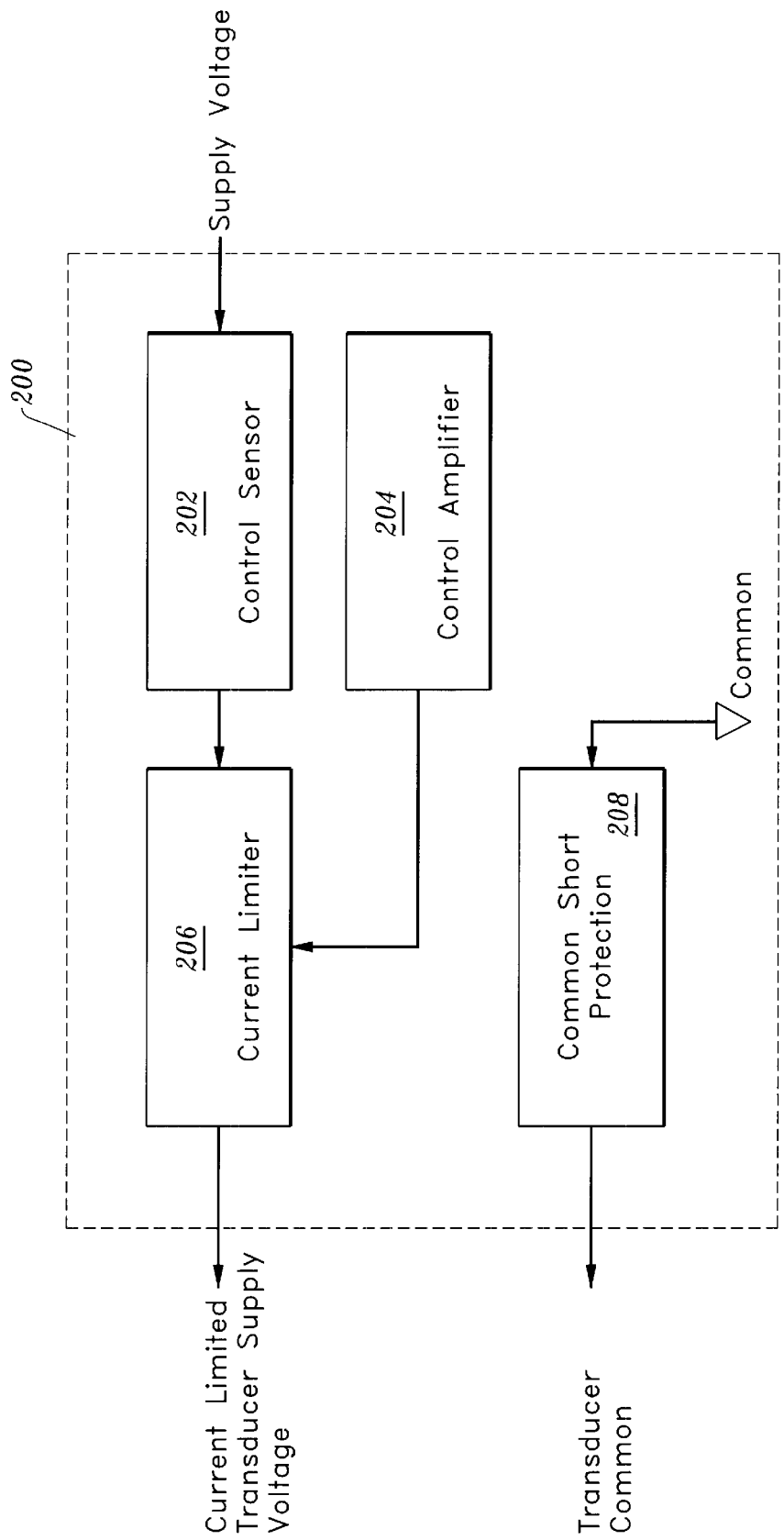

Referring to FIGS. 11 and 13, one transducer power and current limiting module 200 is operatively coupled to each transducer 16. Specifically, the transducer power and current limiting module 200 includes a current sensor 202, a control amplifier 204, a current limiter 206 and a common short protection module 208. The current sensor 202 is operatively coupled to the transducer interface module power supply 178, the control amplifier 204 and the current limiter 206. The control amplifier 204 is in turn operatively coupled the current limiter 206. The current sensor 202 senses the current being received from the power supply 178 and delivers the current to the current limiter 206 and control amplifier 204. The current limiter 206 delivers current to the transducer 16 under the control of the control amplifier 204. The common short protection module 208 is operatively coupled to the common of the transducer for providing short circuit protection.

Figure 14:
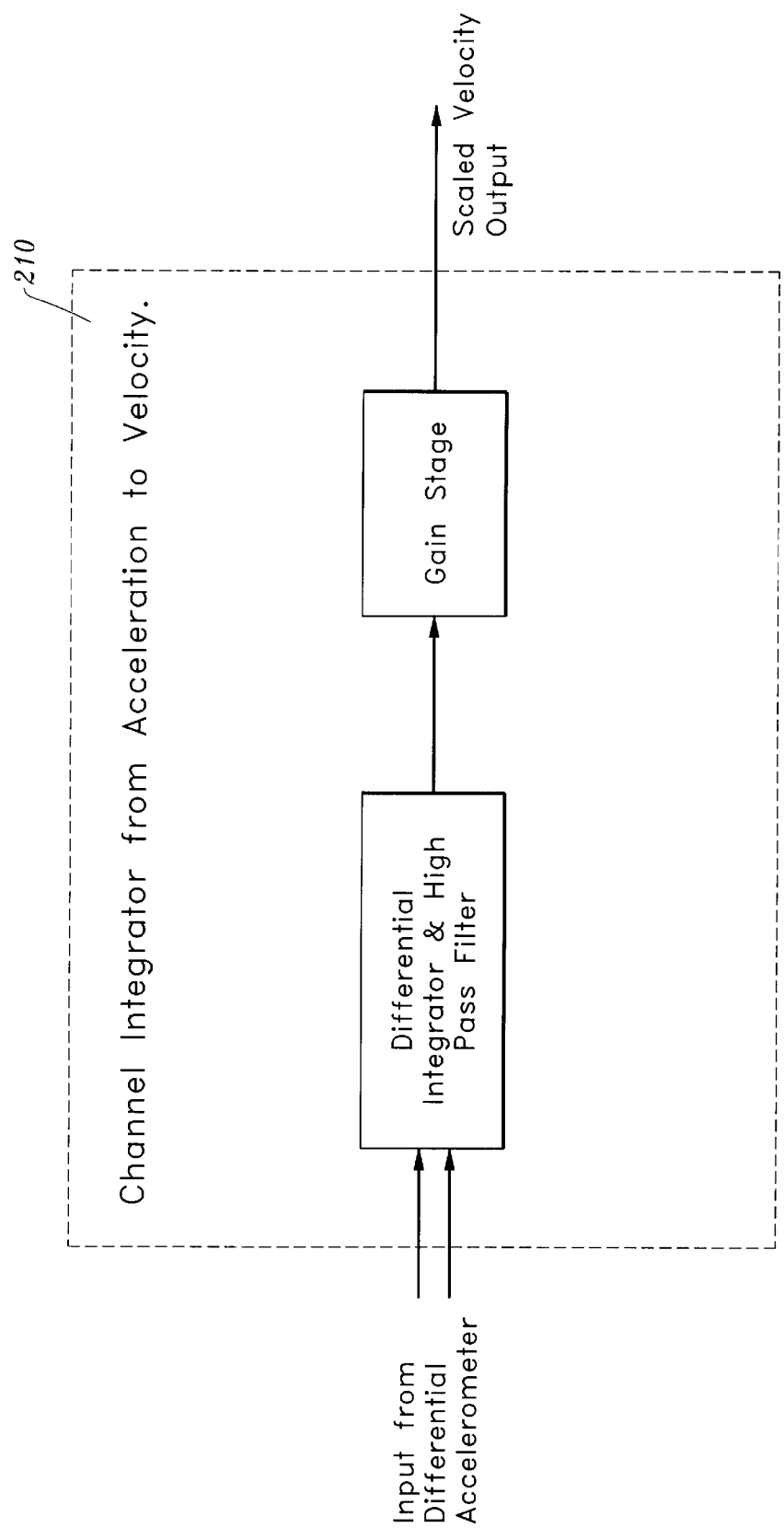

Referring to FIGS. 11 and 14, the integrator module 210 includes a differential integrator and a high pass filter module 212 operatively coupled to transducer 16 in the form of a differential accelerometer. A gain stage 214 is operatively coupled to integrator and high pass filter module 212. Thus, the integrator and high pass filter module 212 integrates and filters the transducer signal which is amplified by gain stage 214 before being sent to the transducer interface module 180 as a scaled velocity output.

Figure 15:
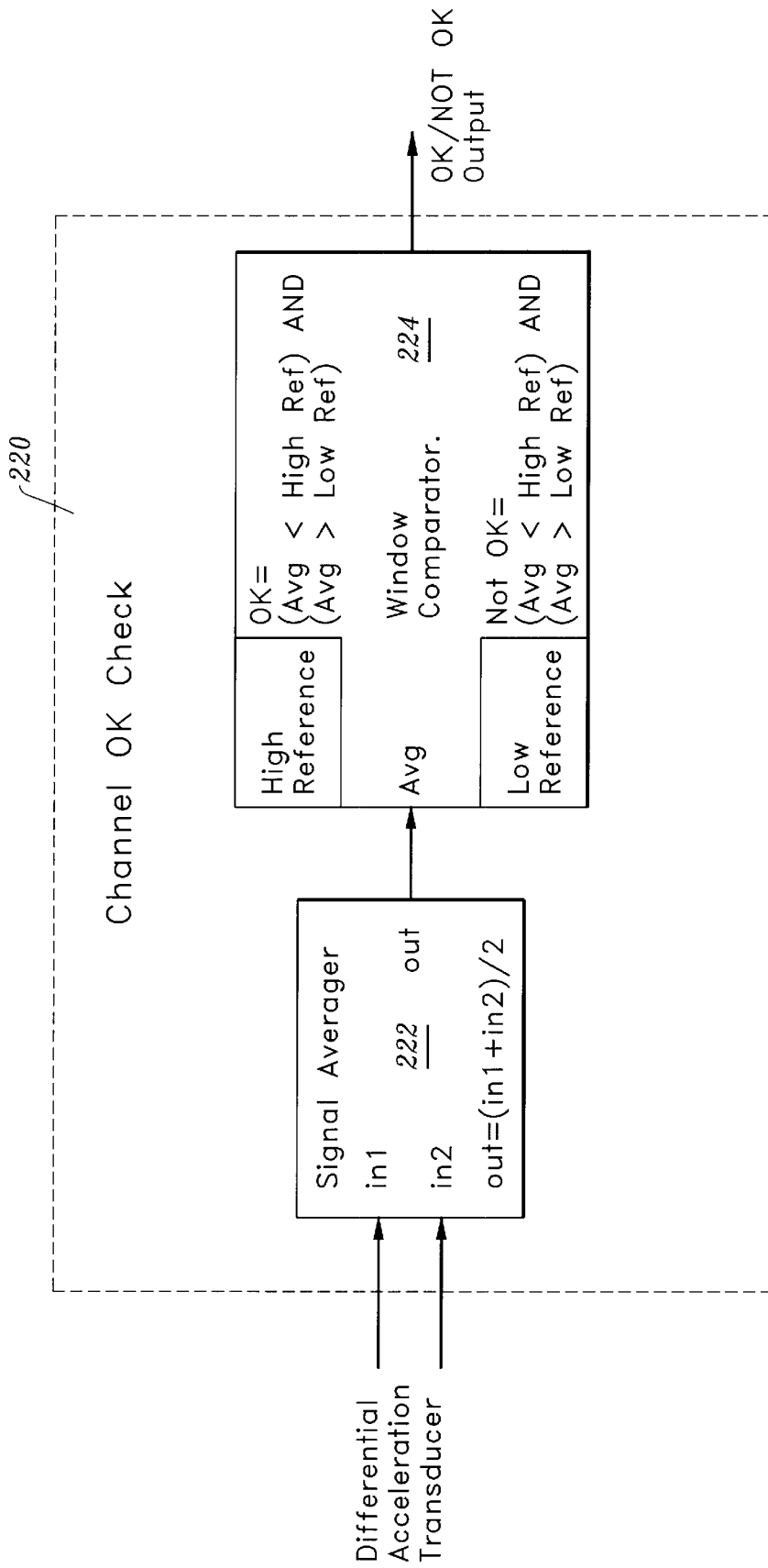

Referring to FIGS. 11 and 15, the OK check modules 220 includes a signal averager and a window comparator. The signal averager 222 is operatively coupled to the transducer 16 and takes the average of the differential signals provided by the transducer 16 when it takes the form of a differential accelerometer. The signal averager 222 is in turn coupled to the window comparator 224 which compares the averaged signal to a high and low reference. Based on this comparison the widow comparator 224 outputs an OK/NOT OK signal to the transducer interface module 180.

Figure 17A:
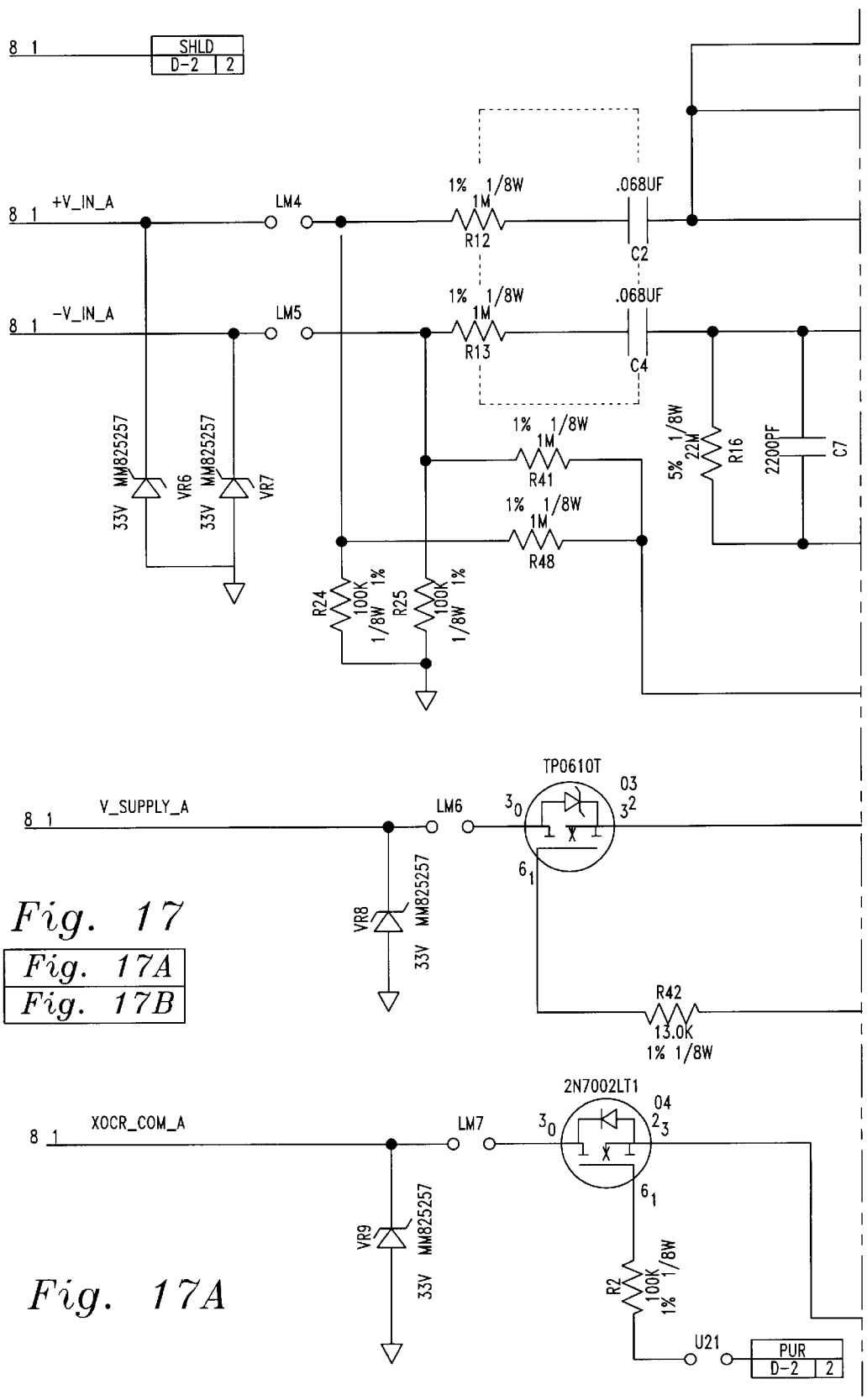
Figure 17B:
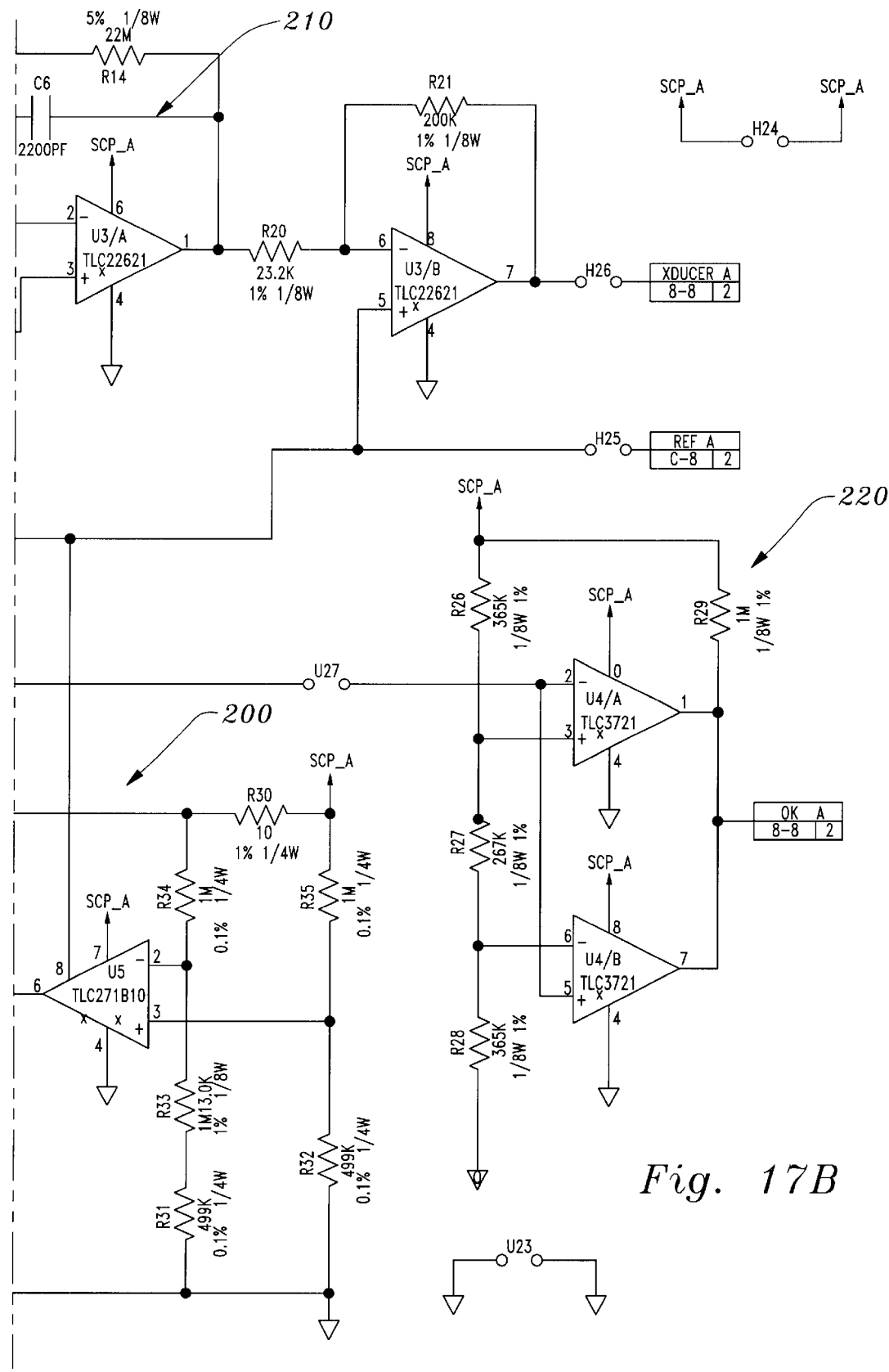

More specifically, FIGS. 16 and 17 shows a detailed schematic of one embodiment of the instrument package electronic means 160. Note that FIG. 17 only shows the electronics for channel A as a result of the electronics for channel B being identical to that shown for channel A.

Referring to FIGS. 10 and 16, the main goal of the communication interface is to operatively couple the signal conditioning circuitry 170 to the data collection system 100, 120. The communication interface includes an bus 272 which is operatively coupled to the signal conditioning circuitry 170. In this embodiment, the signal conditioning circuitry includes two channels operatively coupled to a pair of differential accelerometer transducers labeled transducer A and transducer B.

FIG. 17, shows a detailed schematic the transducer power and current limiting module 200, the integrator module 210 and the channel check module 220. The transducer power and current liming module 200 provides power to transducer A and limits the current to transducer A should a fault occur. The integrator module 210 integrates the signals received from the transducer and provides gain thereto for providing an output signal to the transducer interface module 180 which intern outputs a conditioned signal to the bus system 272. The okay channel check module 220 assures proper operation of transducer A and communicates this proper operation to the transducer interface module 180 which in turn can communicate the condition of transducer A to the data collection via the bus system 272. The circuitry operatively coupled between transducer B and the bus system works in a similar manner as described hereinabove for transducer A. FIG. 16 shows a detailed schematic of channel A and channel B transducer interface modules 180, the transducer and interface power supply and the bus system 272.

Each transducer interface module 180 has a unique address associated therewith by setting the binary DIP switch 130. Preferably, the switch is an eight position binary switch. Address 1 through 255 are valid for transducer interface modules 180 connected to the processor 100,120. During data collection the signal processor searches a line for the specific transducer interface module address and powers it. A reading of current data is taken from that measurement point and transferred to the processor 100 or 120 for processing. After all necessary processing has occurred, the transducer interface module 180 is then powered down and then the processor 100 or 120 searches for the next sequential transducer interface module address. More specifically, the processor sends an address and command from the adapter to a specific transducer interface module 180. The transducer interface module will then send back a calibration value for the transducer type which is connected to the module through the transducer signal conditioning circuitry. This signal is sent back to the data collection computer. The processor communicates with the transducer interface module 180 by sending a 16 bit digital address produced by flipping the polarity of the power and com lines. A diode bridge is used to create a constant dc power source for the transducer interface module even through the positive and negative lines are being flipped in their voltage polarity. External transistors Q1 and Q2 work in conjunction with the voltage regulator 182 internal to the transducer interface module for voltage regulation needs of the internal circuitry of the transducer interface module. The regulator will provide a 5 volt regulated voltage to the rest of the transducer interface module integrated circuitry. When the transducer interface module has been sent its address it will compare the first 8 bits of the command string to the settings on the transducer module address switch 130. If a match occurs, it will turn on and provide power to the signal transducer circuitry and transducer coupled thereto.

Resistors R3 and R4 work as current limiters to an address receiving section of the transducer interface module to receive the command signal including the differential address being sent down the line from the processor. A crystal y1 is connected to the oscillator within the transducer interface module which provides a clock signal for the logic in the chip. The transducer interface module takes a signal from the transducer which comes in on the xducer A and xducer B lines. When the module senses the command which is identifying a transducer signal it converts the signal which is nominally between 0.5 to 4.5 volts to a differential voltage outputted to a signal plus and a signal minus line coupled to pin 4 and pin 5 of the junctions J1 through J3 of the terminal block. Thus, the transducer signal is translated from a single ended signal to a differential signal. The module regulator 182, 184 is set by a potentiometer such that the regulator voltage is within 10 milivolts of 5 volts. The potentiometer is used as a reference for the signal conditioning circuitry.

Two other commands are sent to the transducer interface module 180 in the form of a low calibration signal and a high calibration signal. In this mode the transducer line that is coupled to the module is replaced with a ground line connected to ground of the module for providing the low calibration signal and then switched over to a high line for sending a 5 volt or high calibration signal. These calibration signals are stored in an output buffer which allows the buffer to have a known zero volt and a known 5 volt reference at an input to an output driver or buffer. The processor also uses these calibration voltages as references.

Thus, these calibration voltages allow the processor to keep track of voltages so that it can compensate for any differences in the gain of the transducer interface module drivers or any difference in the cabling caused by resistance or capacitance. Therefore, when ever a transducer interface module has data collected from it, it will receive a calibration reading signal before it receives a reading from the transducer.

The OK checking circuit module 220 is used to detect various things in different transducer interface modules. In the case of the accelerometer, the checking circuit means make sure the transducer's bias is at an appropriate level (for example, 2.5 volts). Thus, if any cables are cut or shorted to the transducer or if there is failure of the transducer circuitry it will detect same.

This detection is provided by the circuitry 220 outlined in the schematic shown if FIG. 17. A high, 5 volts, signal is outputted from the circuitry if the transducer is operating properly and a low, 0 volts, is outputted from the circuitry if the transducer is not working in the OK range. The low signal will turn off the output drivers 196 of the transducer interface module when it is in transducer mode. The processor will then determine that there is anomalies associated with the transducer or wiring interposed therebetween.

Figure 9:
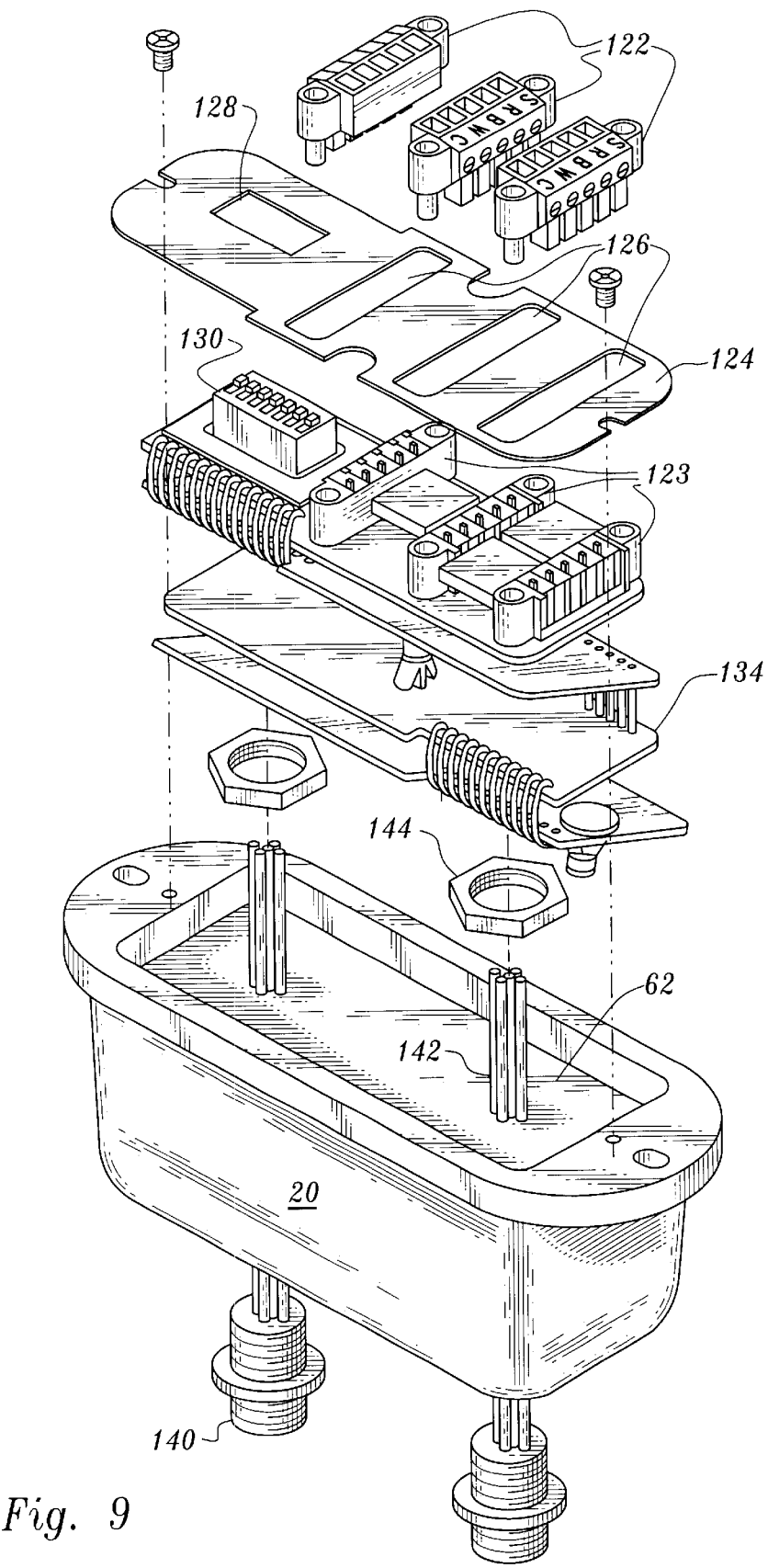
FIG. 9 is an alternative exploded parts perspective view of the integrated instrument package according to the instant invention.
Figure 20:
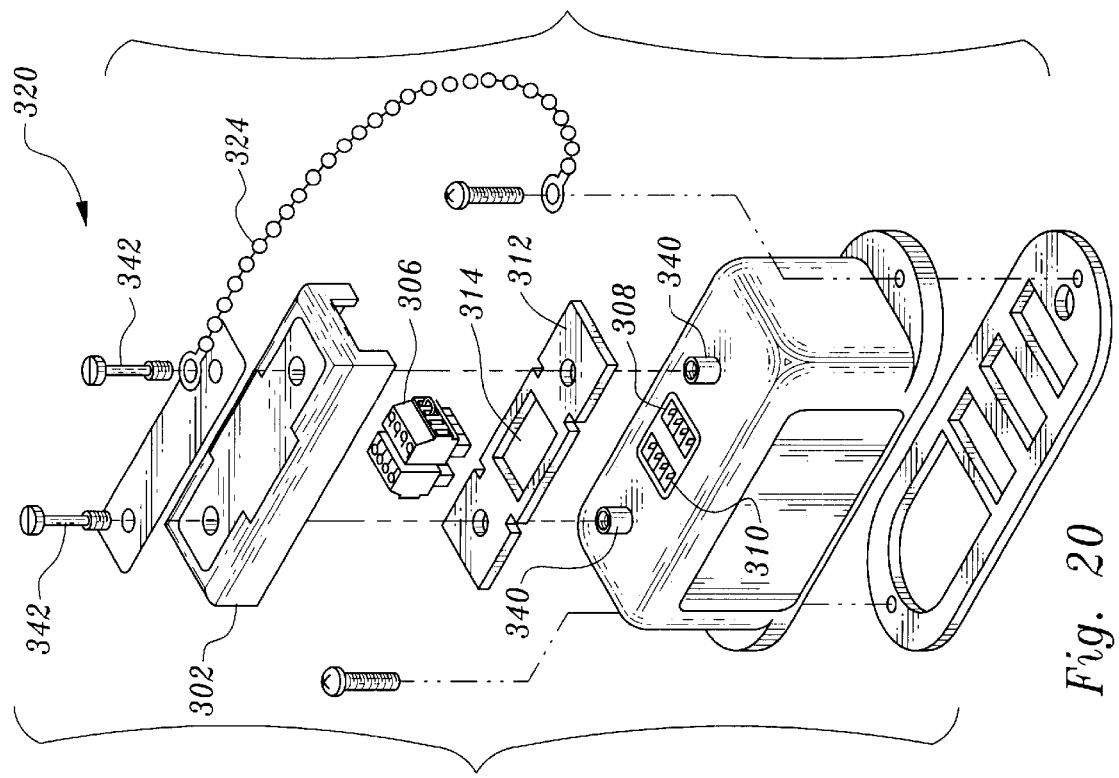
FIGS. 19 and 20 are exploded parts perspective views of the integrated instrument package shown in FIG. 18.
Figure 19:
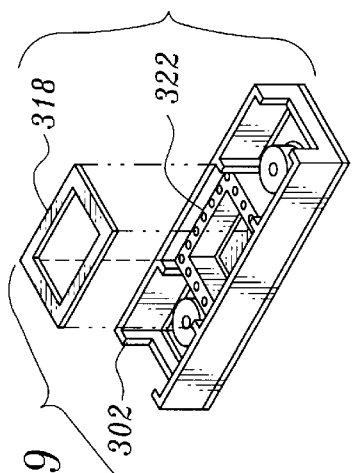
Figure 18:
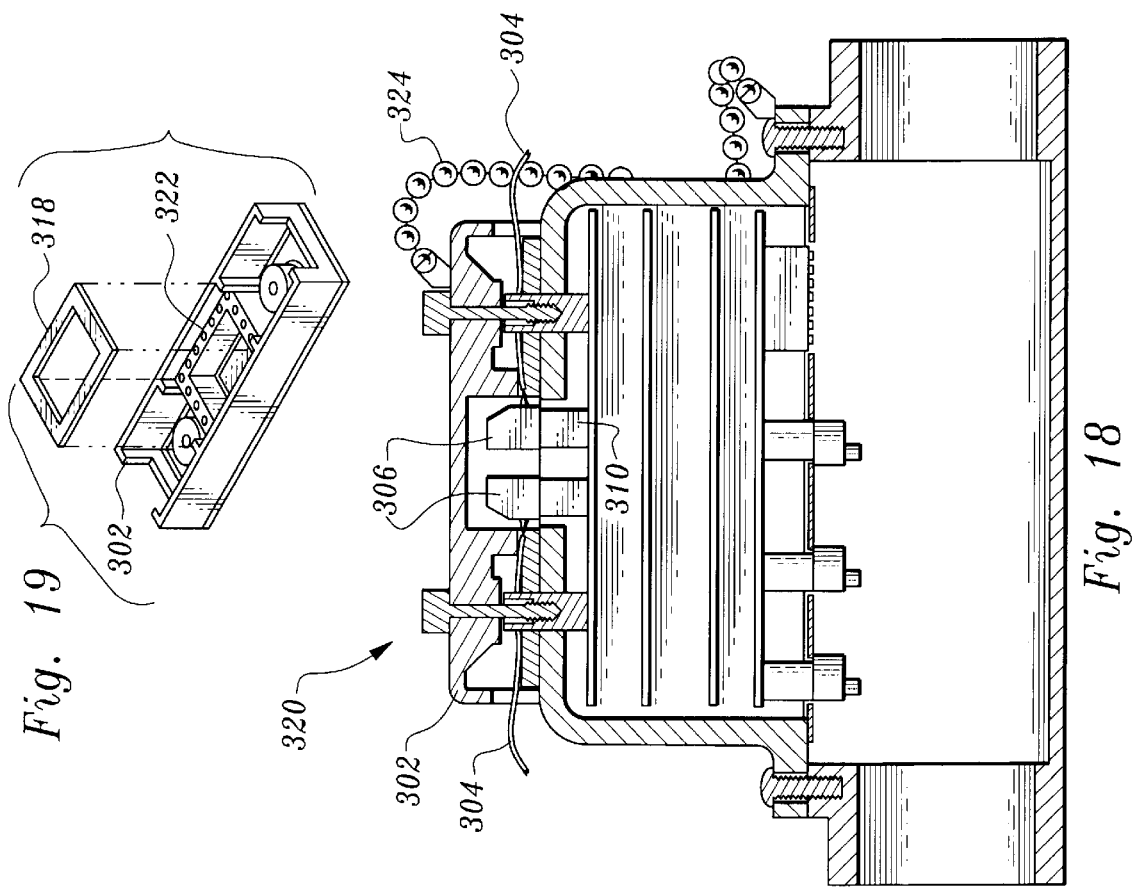
FIG. 18 is a sectional view showing the conduit and an alternative instrument package deployed.

FIGS. 18 through 20 reflect a variation compared to that which was shown in FIGS. 9 and 10, for example. The similar part numbers will not be belabored, only the differentiating structure. As shown, the instrument package 320 replaces the transducer couplings 140 with upwardly extending posts 340 having an inner threaded bore to receive screws 342 which fix a protective cover 302 to a top surface of the previously discussed structure. The protective cover 302 houses therewithin either a thermal couple wiring harness 304 or conductors for a resistor temperature detector (RTD). The conductors 304 communicate with strip connectors 306 which allow connection to the thermal couple or RTD and an access portal 308 includes a complemental fastener 310 extending into the previously described instrument package to allow operative coupling to the circuitry mentioned earlier. A gasket 312 underlies the protective cover 302 to prevent contamination by sealing the outer periphery of the protective cover 302 which has a substantially rectangular footprint. The gasket 312 has a corresponding fenestration 314 to allow the connector 306 to mate with its complemental connector 310. Clearance is also provided for the screws 342 to engage the posts 340. FIG. 19 shows the underside of the protective cover 302 and depicts a further sealing gasket 318 adapted to provide a final barrier preventing contamination where the connectors 306 are located as the wires 304 pass therethrough. The gasket 318 has a generally rectangular shape complemental to the fenestration 314 and seats upon a ridge 322 complementally formed to provide good pressure between the cover 302 and its underlying support through the gaskets. A retaining chain 324 extends between the protective cover 302 and its underlying instrument package housing. In hazardous environments, the retaining chain is required as a safety measure. FIG. 18 shows the operative coupling of the connector 310 to the underlying circuit board discussed above.

Figure 21:
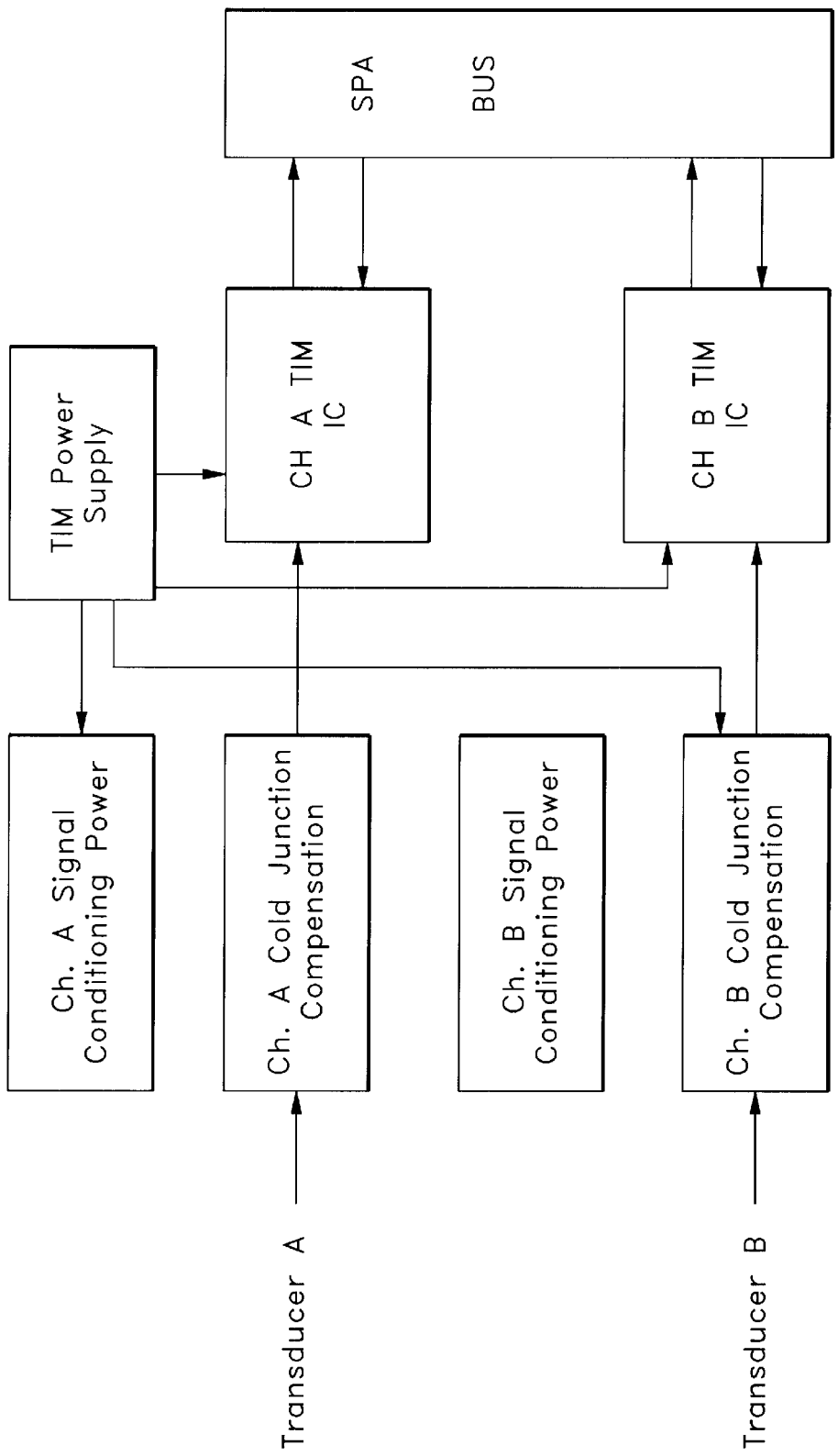
FIG. 21 is a block diagram of the instrument package electronic means for thermocouple and RTD embodiments according to the instant invention.
Figure 22:
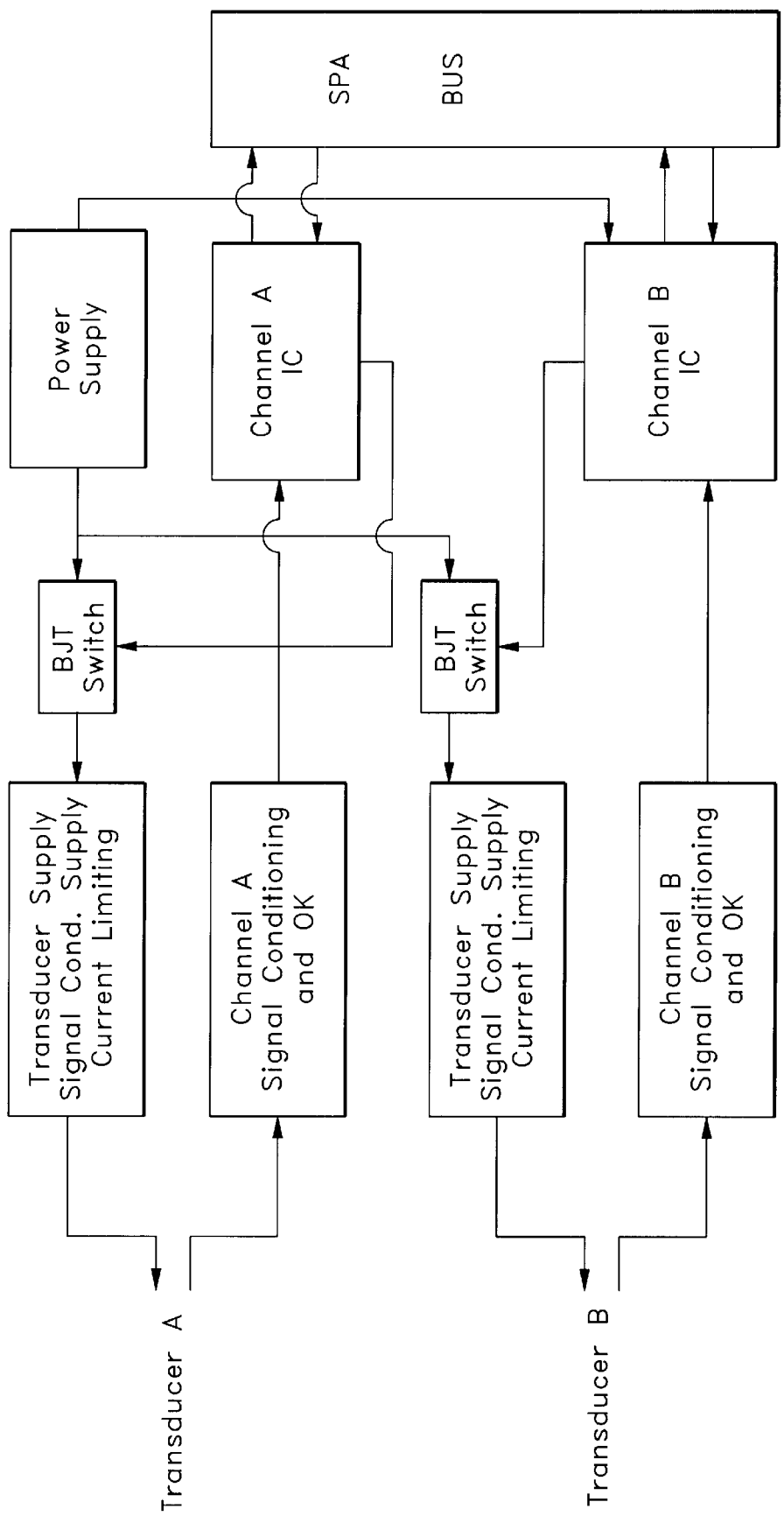
FIG. 22 is a block diagram of the instrument package electronic means for a dual pressure embodiment according to the instant invention.

FIG. 21 reflects a block diagram depiction of how the thermal couple (and for example RTD) device is operatively coupled. As mentioned earlier, each integrated instrument package allows two channels to communicate with transducers on the asset being monitored. Channel A and channel B are shown in FIG. 21 as receiving a signal from transducer A and transducer B in parallel whereupon a cold junction compensation instrumentality conditions the signal. Power is applied through an appropriate source as shown in FIG. 21. Power is also supplied to the transducer interface module integrated circuits whereupon the bi-directional transfer of data extends with a bus for the discrete extraction and assessment of transducer information upon demand. FIG. 22 shows a similar setup for a dual pressure transducer hookup in which a power supply feeds a bipolar junction transistor switch which in turn drives the transducers supply signal conditioning supply and current limiting. The return signal from the transducer includes signal conditioning and verification whereupon the signal is outputted through the integrated circuit and thence to the bus as described earlier.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. A system for monitoring machine data, comprising, in combination:

a plurality of machines to be monitored, sensor means operatively coupled to each of said plural machines, each said sensor means delivering an output signal correlative of the machine data, and conduit extending proximate to said sensor means and leading to a signal processor, a sealed instrument package removably coupled to said conduit and operatively coupled to at least one of said sensor means for allowing communication between said at least one of said sensor means and said signal processor via signal conductors passing from said at least one of said sensor means, through said instrument package and to said signal processor, and said sealed instrument package comprised of an encapsulated circuit and an exposed manually manipulable addressing means operatively coupled to said encapsulated circuit such that said manually manipulable addressing means is exposed and manually settable to provide said sealed instrument package with a unique address when said sealed instrument package is decoupled from said conduit and such that said exposed manually manipulable addressing means is sealed within said conduit when said sealed instrument package is coupled to said conduit.

2. The system of claim 1 wherein said sealed instrument package includes a casing having a hollow interior which houses said circuit in a sealed environment, said circuit comprised of both a signal conditioning circuit and a communication interface, said signal conditioning circuit coupled to said at least one of said sensor means and to said communication interface, said communication interface coupled to said signal processor.

3. The system of claim 2 wherein said signal conditioning circuit includes a sensor interface module operatively coupled to said at least one of said sensor means, said interface module including a control logic circuit operatively coupled to said signal processor via said communication interface and said control logic circuit including a unique address for identifying said sealed instrument package.

4. The system of claim 3 wherein said sensor interface module further includes a multiplexer operatively coupled to said control logic circuit, to said at least one of said sensor means and to said signal processor wherein when said signal processor outputs said unique address to said control logic circuit said control logic circuit sends a logic signal to said multiplexer for enabling a signal engendered from said sensor means to be transmitted through said multiplexer and to said signal processor via at least one of said signal conductors.

5. The system of claim 4 wherein said sensor interface module further includes a line driver having an input coupled to said multiplexer and an output coupled to said at least one of said signal conductors for driving said at least one of said signal conductors to transmit said sensor signals outputted from said multiplexer to said signal processor.

6. The system of claim 5 wherein said control logic circuit sends a logic signal to said multiplexer for enabling a calibration signal to be transmitted through said multiplexer and to said signal processor via at least one of said signal conductors wherein said calibration signal is used by said signal processor as a reference signal.

7. The system of claim 6 wherein the signal conditioning circuit further includes a checking circuit operatively coupled to said at least one of said sensors for determining proper operation of said at least one of said sensor means and communicating this proper operation to said signal processor.

8. The system of claim 1 wherein said sealed instrument package includes a casing having a top wall lying in a first plane and connected to four side walls lying in a second plane substantially perpendicular to the first plane wherein said top wall and said side walls define a hollow interior of said casing.

9. The system of claim 8 further including a protective cover lying on top of said top surface for housing connectors removably attachable to conductors, said conductors extending from said connectors and passing through said housing to an outside environment.

10. The system of claim 9 wherein said connectors are coupled to a complemental fastener extending through said top wall of said sealed instrument package via an access portal.

11. A system for monitoring machine data, comprising, in combination:

a conduit extending proximate to a plurality of sensors and leading to a signal processor, each said sensor coupled to a machine to be monitored;

at least one conductor running through said conduit and electrically coupled to said signal processor;

an opening in said conduit exposing a terminal of said at least one conductor;

a sealed instrument package coupled to at least one of said sensors and removably coupled to said conduit at the opening;

said sealed instrument package including:

a connector removably attachable to said terminal;

an encapsulated control logic circuit, and an exposed manually manipulable addressing means comprised of a plurality of switches operatively coupled to said encapsulated control logic circuit such that said manually manipulable addressing means is exposed and manually settable to provide said sealed instrument package with a manually settable unique address for adjustably setting a unique address of said control logic circuit for identifying said sealed instrument package when said sealed instrument package is decoupled from said conduit and such that said exposed manually manipulable addressing means is sealed within said conduit when said sealed instrument package is coupled to said conduit;

wherein signals engendered from at least one of said sensors are communicated through said sealed instrument package and to said signal processor after said control logic circuit is addressed by said processor with said manually settable unique address.

12. The system of claim 11 wherein said sealed instrument package further includes a multiplexer operatively coupled to said sealed control logic circuit, to at least one of said sensors and to said signal processor wherein when said signal processor outputs said manually settable unique address to said control logic circuit, said encapsulated control logic circuit sends a first logic signal to said multiplexer for enabling a calibration signal to be transmitted through said multiplexer to said signal processor and then said encapsulated control logic circuit sends a second logic signal to said multiplexer for enabling said signal engendered from at least one of said sensors to be transmitted through multiplexer and to said signal processor.

13. The system of claim 11 further including a checking circuit operatively coupled to at least one of said sensors and to said signal processor for determining proper working operation of said at least one of said sensors and communicating this proper operation to said signal processor.

14. The system of claim 11 wherein said plurality of switches are configured as a binary dual-in-line package (DIP) switch.

15. The system of claim 11 wherein said sealed instrument package includes a second connector removably attachable to a second conductor running through said conduit to a second opening in said conduit exposing a second terminal of said second conductor, said system further including a second sealed instrument package coupled to at least one of said sensors and to said conduit at said second opening, said second sealed instrument package including a connector removably attachable to said second terminal for coupling said second sealed instrument package to said signal processor through said sealed instrument package.

16. A system for monitoring machine data, comprising in combination:

a conduit extending proximate to at least one sensor and leading to a signal processor, said at least one sensor coupled to a machine to be monitored;

an instrument package coupled to said conduit for allowing communication between said at least one sensor and said signal processor via signal at least one conductor passing from said at least one sensor, through said instrument package and said conduit, and to said signal processor;

wherein said instrument package includes a circuit having a unique address means for uniquely identifying said instrument package such that when said signal processor outputs said unique address to said circuit, said at least one sensor transmits a calibration signal and an output signal through said instrument package and conduit, and to said signal processor via said at least one conductor, and wherein said circuit includes a multiplexer means for multiplexing both said calibration signal and said output signal from said at least one sensor onto said at least one conductor for sequential transmission of said calibration and output signals through said instrument package and conduit, and to said signal processor, and wherein said calibration signal is comprised of a low calibration signal and a high calibration signal, said low calibration signal being obtained by switching said at least one conductor to a ground line providing ground for said at least one sensor and said high calibration signal being obtained by switching said at least one conductor to a voltage line powering said at least one sensor.

* * * * *